(12) United States Patent
Schwegman

(10) Patent No.: US 11,293,550 B2
(45) Date of Patent: Apr. 5, 2022

(54) METAL-TO-METAL SEALING SYSTEM WITH LOW COMPONENT SPREADING REQUIREMENTS

(71) Applicant: FMC Technologies, Inc., Houston, TX (US)

(72) Inventor: Steven L. Schwegman, Spring, TX (US)

(73) Assignee: FMC TECHNOLOGIES, INC., Houston, TX (US)

( * ) Notice: Subject to any disclaimer, the term of this patent is extended or adjusted under 35 U.S.C. 154(b) by 138 days.

(21) Appl. No.: 16/632,774

(22) PCT Filed: Jul. 28, 2017

(86) PCT No.: PCT/US2017/044279
§ 371 (c)(1),
(2) Date: Jan. 21, 2020

(87) PCT Pub. No.: WO2019/022749
PCT Pub. Date: Jan. 31, 2019

(65) Prior Publication Data
US 2020/0166136 A1  May 28, 2020

(51) Int. Cl.
*F16J 15/08* (2006.01)
*F16L 23/20* (2006.01)
*F01D 11/00* (2006.01)
*F16J 15/06* (2006.01)

(52) U.S. Cl.
CPC .......... *F16J 15/0887* (2013.01); *F16L 23/20* (2013.01); *E21B 2200/01* (2020.05); *F01D 11/005* (2013.01); *F16J 15/062* (2013.01); *F16J 15/0881* (2013.01)

(58) Field of Classification Search
CPC .... F16J 15/00; F16J 15/02; F16J 15/46; F16J 15/48; F16J 15/021; F16J 15/08; F16J 15/0881; F16J 15/0887; F16J 15/06; F16J 15/061; F16J 15/0831; F16J 15/062; F16L 23/00; F16L 23/16; F16L 23/18; F16L 23/20; E21B 2200/00; E21B 2200/01; F01D 11/00; F01D 11/005
USPC .......................................................... 277/644
See application file for complete search history.

(56) References Cited

U.S. PATENT DOCUMENTS 2,898,000 A * 8/1959 Hanny ................. F16J 15/0887
                                                      277/649
4,410,186 A * 10/1983 Pierce, Jr. ............... F16L 23/20
                                                      277/318
5,058,906 A * 10/1991 Adamek .............. F16J 15/0887
                                                      277/614

(Continued)

OTHER PUBLICATIONS

International Search Report and Written Opinion dated Mar. 27, 2018 for PCT/US2017/044279.

*Primary Examiner* — Nathan Cumar
(74) *Attorney, Agent, or Firm* — Osha Bergman Watanabe & Bergman LLP

(57) ABSTRACT

A low-spread metal ring gasket includes a lower ring gasket portion having a bottom surface and an upper ring gasket portion having an upper surface. The lower ring gasket portion includes at least one ring gasket sealing surface extending upward from the bottom surface, and the upper ring gasket portion includes at least one sealing bump protruding upward form the upper surface.

21 Claims, 14 Drawing Sheets

(56) References Cited

U.S. PATENT DOCUMENTS

2006/0220326 A1\* 10/2006 Leadley-Brown ..... F16J 15/062
                                                           277/609

\* cited by examiner

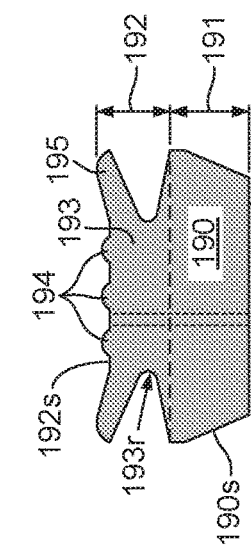
Fig. 11A
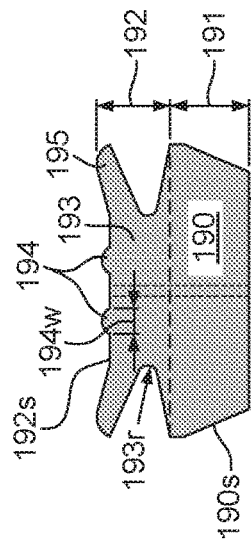
Fig. 11B
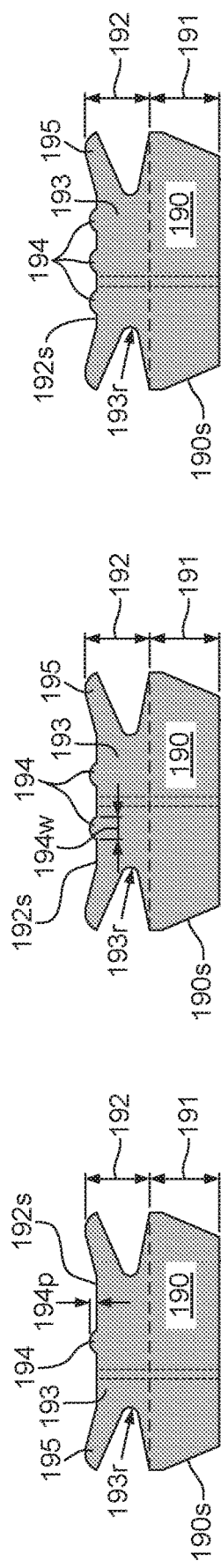
Fig. 11C
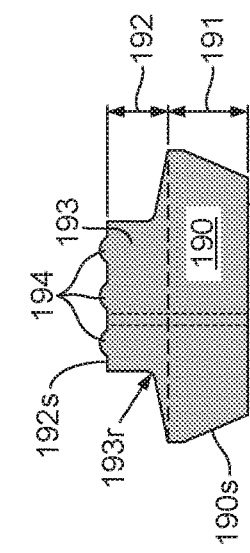
Fig. 12A
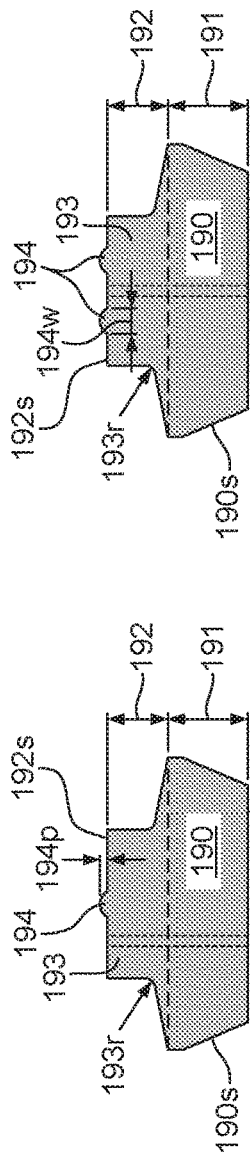
Fig. 12B
Fig. 12C
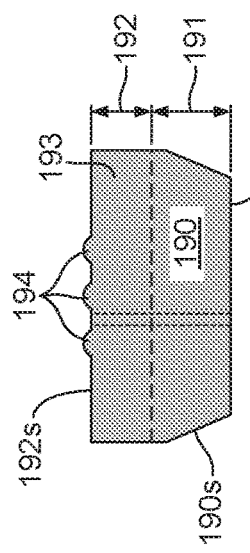
Fig. 13A
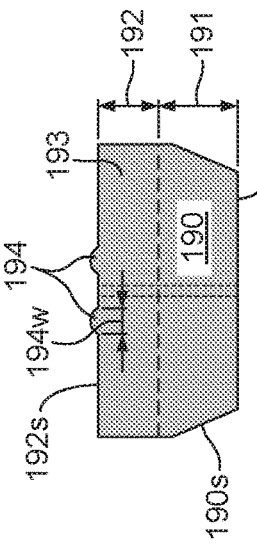
Fig. 13B
Fig. 13C

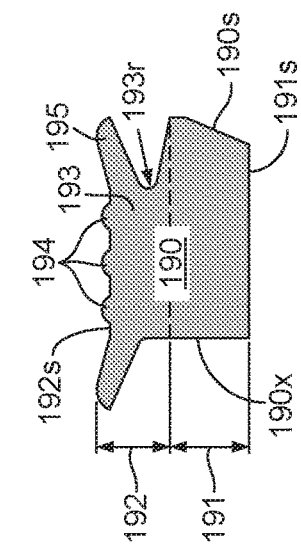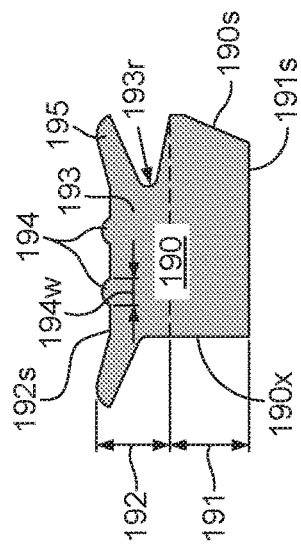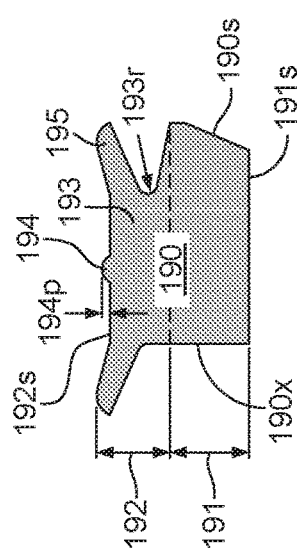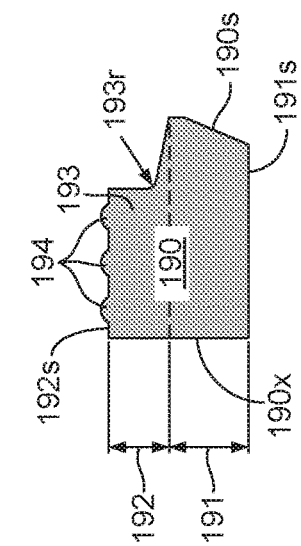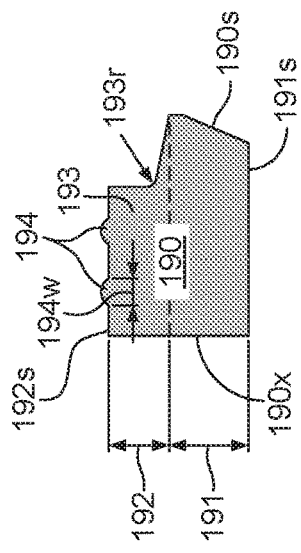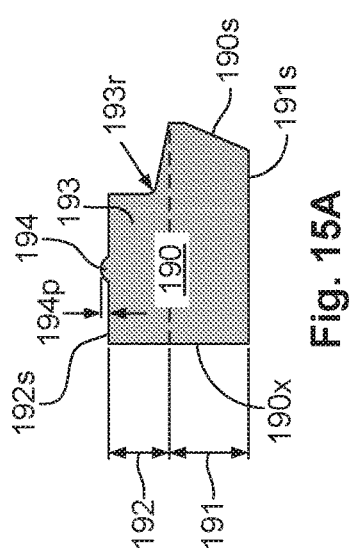

METAL-TO-METAL SEALING SYSTEM WITH LOW COMPONENT SPREADING REQUIREMENTS

BACKGROUND

1. Field of the Disclosure

The present disclosure is generally directed to metal ring gaskets and metal-to-metal sealing systems that require a low amount of spread distance for removing pressure-retaining components.

2. Description of the Related Art

In many different industries, it is often necessary to make pressure-tight sealing connections in a system between various pieces of equipment that are used to process and/or circulate fluids (e.g., pumps, compressors, tanks, vessels, etc.), between tubular products that are used to transfer fluids between pieces of equipment (e.g., piping, fittings, valves, etc.), or between the processing equipment and the tubular products. Generally, these pressure connections are required so as to allow for the removal of equipment and/or other pressurize-retaining components from the system for purposes of inspection, maintenance, repair, and/or replacement and the like. Furthermore, when properly located within the system, and the use of such pressure connections facilitates the removal of single individual pressure-retaining components from the system while leaving all other pressure-retaining components in place.

In most applications, a pressure-tight sealing connection is established by clamping the sealing surfaces of two mating pressure-retaining components together, generally with a sealing component positioned between the two mating sealing surfaces, thus affecting the pressure-tight seal between the two mating components. The structure and configurations of these sealing surfaces, the materials and configurations of the sealing components, and the mechanisms that may be used to clamp the sealing surfaces together with a sealing component positioned therebetween is vast and varied. In many applications, bolted flange connections are often used, although threaded or clamped connections are also used. The sealing components used with such bolted flange connections are often annularly shaped seal rings or gaskets in a variety of configurations and material types, include compressible non-metallic, semi-metallic, and metallic flat gaskets, resilient spiral-wound type gaskets, pressure-energized elastomeric seal rings, and pressure-energized metal seal rings.

In order to remove one of the pressure-retaining components from service for a requisite inspection, maintenance, repair, or replacement activity, it is often necessary to separate the mating connections (e.g., flanges) of the two pressure-retaining components—which are normally bolted together in order to hold the mating connections in contact with each other and the interposed sealing component—by spreading the sealing surfaces (e.g., flange faces) apart. This connection spreading operation is intended to provide adequate clearance between the sealing surfaces of the two mating connections so that one or both of the sealing surfaces are not unduly damaged during the component removal operation. In many situations, such as when the pressure-retaining components have been in service for an extended period of time and under high bolting pre-loads, the connections often tend to adhere to one another through the sealing component, thus making separation of the connections difficult. Furthermore, additional forces are exerted on the connections by other systems components—such as the tubular products (e.g., pipes) that provide fluid communication between the various other equipment components of the system—which increase the difficulty of separating the connections by the appropriate clearance distance. As such, when it because necessary to spread the sealing surfaces and separate the connections, any residual adherence forces between the connections and the forces imposed by attached tubular products and/or other system components must both be overcome. To that end, apparatuses known in the art as "flange spreaders" or "flange separators"—of which there are many different designs and operating principles—have been utilized for several decades in order to exert a spreading/separating force on the opposing connection that is sufficient high to initially break apart any strongly adhering connections, and to further "spring" the connecting tubular components such that the sealing surfaces (e.g., flange faces) are spread apart by the requisite removal clearance distance.

However, such flange spreaders are often bulky and cumbersome, and also may be difficult to mount and keep properly aligned, particularly in systems with many components and/or crowded equipment and piping layouts. Furthermore, the "springing" of the connecting piping can often have detrimental effects on other equipment components to which the piping may be attached, such as the loosening and consequent leaking of other mating connections, particularly in systems having a lower overall piping layout flexibility. Accordingly, it is often desirable to minimize as much as possible the amount of flange face spreading—and consequently, the magnitude of the loads that are imposed on the system during the spreading operation—that is needed to provide a sufficient clearance distance for removing a pressure-retaining component from service. As such, some "low-spread" sealing systems have been developed to address the concerns associated with flange spreading operations in general. Some benefits and differences between a low-spread sealing system and a typical metal-to-metal sealing system will now be described in conjunction with FIGS. 1-6

FIGS. 1-3 depict various cross-sectionals view of an exemplary prior art low-spread sealing system configuration, that is, one in which a minimal amount of spreading is necessary in order to sufficiently separate the connections of two mating pressure-retaining components so that the seal ring or gasket can be removed and replaced, or so that one of the components can be removed for maintenance and/or repair activities. As shown in FIG. 1, a first connection 112 (depicted as a typical flanged connection) of a first pressure-retaining component 110 is connected to a corresponding second (flanged) connection 122 of a second pressure-retaining component 120 by a plurality of fasteners 119, which are shown as typical threaded studs 119s that are tightened using pairs of threaded heavy hex nuts 119n. In the depicted configuration, the first connection 112 has a raised face 113 that protrudes from the front side of the first connection 112, and the second connection 122 has a raised face 123 that protrudes from the front side of the second connection 122. A pressure-tight seal is created between the first connection 112 and the second connection 122 by an elastomeric seal 130, such as an O-ring seal, that is positioned in an O-ring groove 116 machined in the front face 114 of the raised face 113 on the first connection 112. In the assembled configuration illustrated in FIG. 1, the O-ring seal 130 seals against the inside surface 116S of the first connection 112 and against a front sealing face 124 on the raised face 123 of the second connection 122. A detailed close-up cross-sectional view of the sealing area in the assembled configuration (depicting the O-ring seal 130 as positioned in the O-ring groove 116) is shown in FIG. 1A. In a typical O-ring sealing configuration, the front face 114 of the first connection 112 is brought into contact with the front face 124 of the second connection 122. However, for drawing clarity, the detailed close-up view of FIG. 1A has been depicted with the front faces 114 and 124 being slightly separated so that the front faces 114 and 124 can be clearly distinguished when the first and second connections 112 and 122 are in the assembled configuration, as shown in FIG. 1.

As noted previously, when either of the two pressure-retaining components 110, 120 need to be removed from the connection assembly for maintenance and/or repair, or when the O-ring seal 130 has to be replaced, the connections 112 and 122 must be spread apart by a sufficient distance so that one of the components 110, 120 can be safely removed while avoiding undue damage to either of the mating connections 112, 122, and in particular, any damage to the respective sealing surfaces. FIG. 2 depicts the assembly of FIG. 1 after it has been disassembled (i.e., after the fasteners 119 have been removed) and the faces 114, 124 have been spread apart (as indicated by the arrows 128) by a clearance distance 139, and FIG. 2A shows a detailed close-up view of the sealing area after flange spreading. Additionally, FIG. 3 shows the assembly of FIG. 2 as the first pressure-retaining component 110 is being laterally moved relative to the second pressure-retaining component 120 (as indicated by the arrow 118), thereby removing the first pressure-retaining component 110 from service.

For the low-spread sealing system design that is provided by the use of an O-ring seal, the minimum required clearance distance 139 will typically range from approximately ⅛" to ¼" (3.2 mm to 6.4 mm), depending on the relevant equipment parameters such as actual seal design, equipment type, equipment size, etc. This low component spreading distance results from the positioning of the O-ring 130 inside of the O-ring groove 116 (i.e., recessed relative to the front face 114), and the relatively small distance 115 (see, FIG. 2A) that the uncompressed O-ring 130 protrudes out of the O-ring groove 116 past the front face 114 when the first and second connections 112, 122 are disassembled. However, in some applications, elastomeric (O-ring type) seals may not be suitable, depending on the design and operating conditions of the pressure-retaining components 110, 120, or they may not even be permissible under certain design codes or standards. For example, in some high pressure and/or high temperature services, such as when the design temperature exceeds 450° F. (232° C.) and/or design pressure exceeds 10,000 psi (70 MPa), design specifications often dictate the use of metal-to-metal sealing systems, many types of which do not lend themselves well to low-spread sealing system designs. FIGS. 4-6 are various cross-sectionals view of one illustrative prior art metal-to-metal sealing system configuration that does not provide a low-spread design.

FIG. 4 illustrates a connection assembly that is similar in some respects to the assembly depicted in FIG. 1. More specifically, FIG. 4 shows a first connection 142 (also depicted as a typical flanged connection) of a first pressure-retaining component 140 that is connected to a corresponding second (flanged) connection 152 of a second pressure-retaining component 150 by a plurality of fasteners 149, which are again depicted as threaded studs 149s and corresponding threaded heavy hex nuts 149n. Additionally, the first and second connections 142 and 152 each have a respective raised face 143, 153 protruding from the front side of the respective connections 142, 152. However, rather than using an elastomeric (O-ring) seal, a pressure-tight seal is created between the first connection 142 and the second connection 152 using a metal ring gasket 160 that is positioned in opposing ring grooves 146, 156 machined in the respective front faces 144, 154 of the raised faces 143, 153 of the first and second connections 142, 152. In many oilfield applications, including high temperature/high pressure applications, the metal ring gasket 160 would generally be in accordance with ANSI/API Specification 6A, such as, for example, a Type R ring gasket, a Type RX pressure-energized ring gasket, or a Type BX pressure-energized ring gasket. In FIG. 4, the metal ring gasket 160 has been depicted with a Type BX ring gasket sealing configuration, wherein the front face 144 of the first connection 142 is typically brought into contact with the front face 154 of the second connection 152 as a metal-to-metal seal is created between the metal ring gasket 160 and the respective seating faces 146s, 156s of the ring grooves 146, 156. A detailed close-up cross-sectional view of the sealing area in the assembled configuration (depicting the BX ring gasket 160 as positioned in the opposing ring grooves 146, 156) is shown in FIG. 4A. However, as with the detail shown in FIG. 1A above, the detailed close-up view of FIG. 4A has been depicted with the front faces 144 and 154 being slightly separated for additional drawing clarity, i.e., so that the front faces 144, 154 can be clearly distinguished when the first and second connections 142, 152 are in the assembled configuration, as shown in FIG. 4.

FIG. 5 shows the assembly of FIG. 4 after it has been disassembled (i.e., after the fasteners 149 have been removed) and the faces 144, 154 have been spread apart (as indicated by the arrows 158) by a clearance distance 169, and FIG. 5A shows a detailed close-up view of the sealing area after flange spreading Additionally, FIG. 6 shows the assembly of FIG. 5 as the first pressure-retaining component 140 is being laterally moved relative to the second pressure-retaining component 150 (as indicated by the arrow 148), wherein the first pressure-retaining component 140 is being removed from service.

Unlike the low-spread design provided by the O-ring sealing configuration of FIGS. 1 and 1A, the metal ring gasket 160 typically protrudes a much greater distance 145 from the front face 144 of the first pressure-retaining component 140 as compared to the relatively small distance 115 that the O-ring seal 130 protrudes beyond the corresponding front face 114 of the first pressure-retaining component 110 (see, FIG. 1A). This is due to the fact that the metal ring gasket 160 must be positioned and seated inside of both of the opposing ring grooves 146, 156 in order to properly affect a pressure-tight seal. Furthermore, while the metal ring gasket 160 remains partially inserted within the ring groove 146 after disassembly, it must still clear the front face 154 of the second pressure-retaining component 150 when either of the two pressure-retaining components 140, 150 are removed from service, which in turn requires that the front faces 144, 154 be spread apart by a significantly greater amount in order to provide the necessary component removal clearance distance 169. For example, the clearance distance 169 between the front faces 144, 154 for those applications in which a metal ring gasket sealing system is utilized may be in the range of approximately ½" to 1½" (12.7 mm to 38 mm) or even greater, depending on the type of metal ring gasket used, and the size and pressure rating of the connections—i.e., a significantly greater distance than that which is needed for the elastomeric/O-ring sealing system.

This greater amount of connection flange face spreading distance can be quite problematic in the high pressure applications where metal ring gaskets are used because of the heavier/stronger system components that are typically needed to meet the higher pressure requirements, which therefore increases the overall stiffness of the components. This in turn leads to the need for: 1) significantly greater flange face spreading loads in order to spread the connections; 2) system designs having a greater degree of flexibility; and/or 3) the use of knock-out spools and the like in order to remove some system components. For example, depending on the layout of the piping system and the relative positioning of adjacent ring gasket connections, such as when two connections are closely spaced and arranged at a 90° angle to each other, they can be "keyed" together such that it becomes difficult to remove one of the connections without loosening other numerous other components within the system. Additionally, when the pressure-retaining components used are of a relatively compact design configuration—such as when compact valves are used in tightly packed manifold or tree designs—the overall stiffer nature of such compact designs further contributes to the spreading problems noted above.

In view of the foregoing, there is a need to develop metal-to-metal sealing systems that allow for a low amount of spread distance between the connections of pressure-retaining components. The following disclosure is directed to various ring gaskets and sealing systems that are intended address, or at least mitigate, some of the above-described shortcomings of existing metal-to-metal sealing systems.

SUMMARY OF THE DISCLOSURE

The following presents a simplified summary of the present disclosure in order to provide a basic understanding of some aspects disclosed herein. This summary is not an exhaustive overview of the disclosure, nor is it intended to identify key or critical elements of the subject matter disclosed here. Its sole purpose is to present some concepts in a simplified form as a prelude to the more detailed description that is discussed later.

Generally, the subject matter disclosed herein is directed to low-spread metal ring gaskets and low-spread metal-to-metal sealing systems that require a low amount of spread distance for removing pressure-retaining components. In one illustrative embodiment, a low-spread metal ring gasket is disclosed that includes a lower ring gasket portion having a bottom surface and an upper ring gasket portion having an upper surface. Additionally, the lower ring gasket portion includes at least one ring gasket sealing surface extending upward from the bottom surface, and the upper ring gasket portion includes at least one sealing bump protruding upward from the upper surface.

In another exemplary embodiment, a low-spread metal-to-metal sealing system is disclosed that includes a first pressure-retaining component having a first connection and a second pressure-retaining component having a second connection. The first connection includes a first front face and a ring groove that is formed in the first front face, and the ring groove includes a first ring groove sealing surface. Furthermore, the second connection includes a second front face and a front sealing surface located on the second front face. Additionally, the disclosed system further includes a low-spread metal ring gasket that is adapted to create a metal-to-metal seal with the first and second pressure-retaining components. The low-spread metal ring gasket includes, among other things, a lower ring gasket portion having a bottom surface and an upper ring gasket portion having an upper surface, The lower ring gasket portion includes a first ring gasket sealing surface extending upward from the bottom surface, wherein the lower ring gasket portion is adapted to be inserted inside of the ring groove, and wherein the first ring gasket sealing surface is adapted to seal against the first ring groove sealing surface. The upper ring gasket portion includes at least one sealing bump protruding upward from the upper surface, wherein the at least one sealing bump has a sealing bump sealing surface that is adapted to seal against the front sealing surface of the second connection.

In yet a further illustrative embodiment of the present disclosure, a low-spread metal-to-metal sealing system includes, among other things, a first pressure-retaining component having a first connection and a second pressure-retaining component having a second connection. The first connection includes a first front face and a ring groove that is formed in the first front face, wherein the ring groove includes inner and outer ring groove sealing surfaces that are located on opposing sides of the ring groove, and the second connection includes a second front face and a front sealing surface located on the second front face, wherein the front sealing surface is substantially parallel to the second front face of the second connection. Additionally, the low-spread metal-to-metal sealing system includes a low-spread metal ring gasket that is adapted to create a metal-to-metal seal with the first and second pressure-retaining components. The low-spread metal ring gasket includes a lower ring gasket portion having a bottom surface and an upper ring gasket portion having an upper surface. The lower ring gasket portion includes inner and outer ring gasket sealing surfaces that extend upward from the bottom surface and that are located on opposing sides of the lower ring gasket portion, wherein the inner and outer ring gasket sealing surfaces are adapted to seal against the respective inner and outer ring groove sealing surfaces. Furthermore, the upper ring gasket portion includes, among other things, a boss extending upward from the lower ring gasket portion, at least one sealing bump protruding upward from the upper surface, and sealing bump protection wings that extend laterally and angularly upward from opposing sides of said boss, wherein the sealing bump includes a sealing bump sealing surface that is adapted to seal against the front sealing surface of the second connection.

BRIEF DESCRIPTION OF THE DRAWINGS

The disclosure may be understood by reference to the following description taken in conjunction with the accompanying drawings, in which like reference numerals identify like elements, and in which:

FIGS. 11A-11C are cross-sectional views of various optional configurations of an exemplary low-spread metal ring gasket in accordance with certain embodiments of the present disclosure;

FIGS. 12A-12C are cross-sectional views of various optional configurations of another illustrative low-spread metal ring gasket in accordance with further embodiments of the present disclosure;

FIGS. 13A-13C are cross-sectional views of various optional configurations of an additional exemplary low-spread metal ring gasket in accordance with other illustrative embodiments of the present disclosure.

FIGS. 14A-14C are cross-sectional views of various modified configurations of the exemplary low-spread metal ring gaskets shown in FIGS. 11A-11C;

FIGS. 15A-15C are cross-sectional views of various modified configurations of the illustrative low-spread metal ring gaskets shown in FIGS. 12A-12C.

Figure 1:
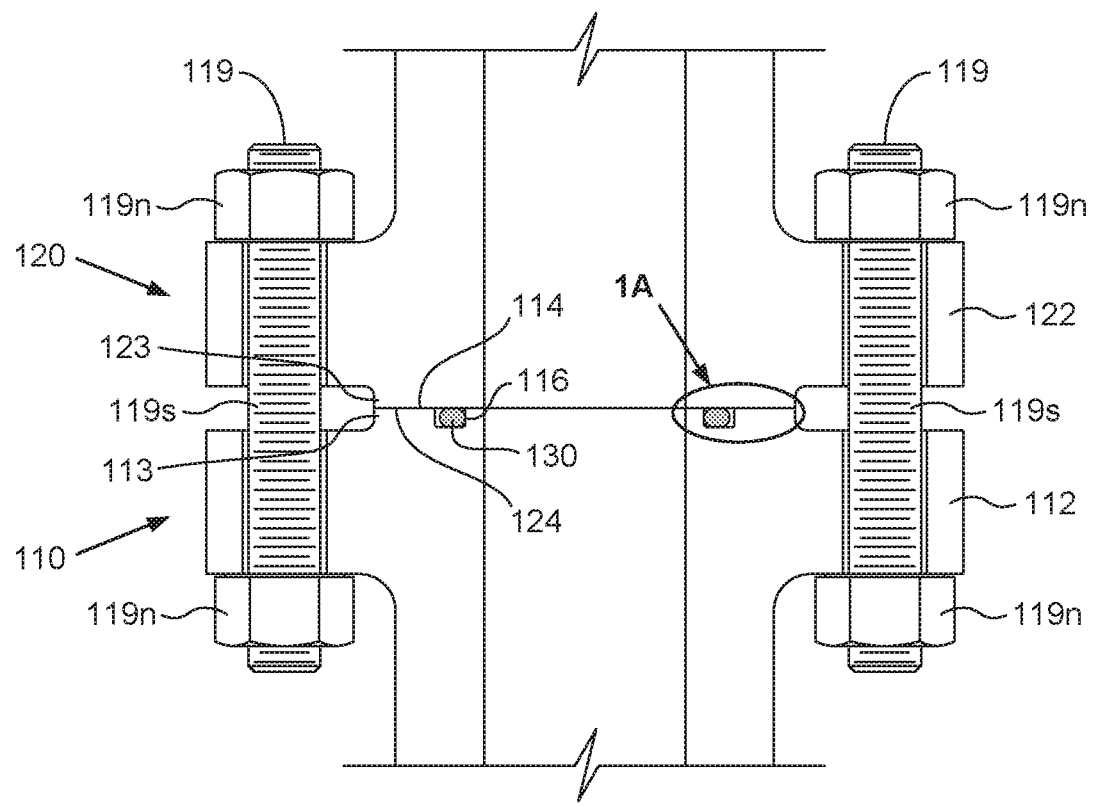
FIG. 1 is a cross-sectional view of an assembled prior art low-spread sealing system configuration.
Figure 1A:
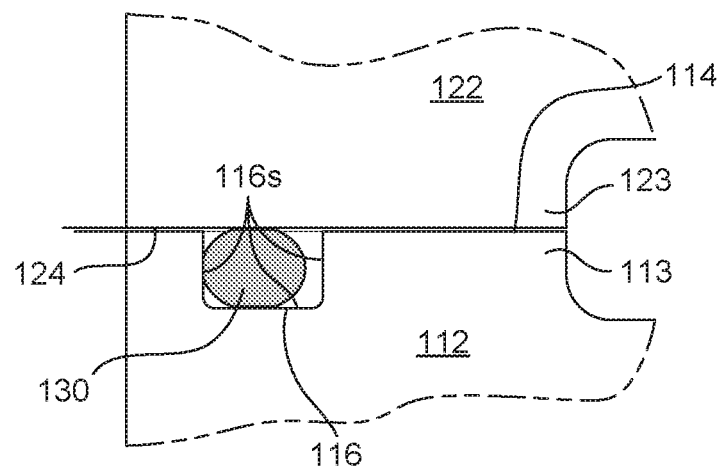
FIG. 1A is a close-up cross-sectional view of the sealing area of the assembly depicted in FIG. 1.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the subject matter defined by the appended claims to the particular forms disclosed, but on the contrary, the intention is to cover all modifications, equivalents, and alternatives falling within the spirit and scope of the claimed subject matter.

DETAILED DESCRIPTION

Various illustrative embodiments of the present subject matter are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various systems, structures and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

As used in this description and in the appended claims, the terms "substantial" or "substantially" are intended to conform the ordinary dictionary definition of that term, meaning "largely but not wholly that which is specified." As such, no geometrical or mathematical precision is intended by the use of terms such as "substantially flat," "substantially perpendicular," "substantially parallel," "substantially circular," "substantially elliptical," "substantially rectangular," "substantially square," "substantially flat," "substantially aligned," and/or "substantially flush," and the like. Instead, the terms "substantial" or "substantially" are used in the sense that the described or claimed component or surface configuration, position, or orientation is intended to be manufactured, positioned, or oriented in such a configuration as a target. For example, the terms "substantial" or "substantially" should be interpreted to include components and surfaces that are manufactured, positioned, or oriented as close as is reasonably and customarily practicable within normally accepted tolerances for components of the type that are described and/or claimed. Furthermore, the use of phrases such as "substantially conform" or "substantially conforms" when describing the configuration or shape of a particular component or surface, such as by stating that "the configuration of the component substantially conforms to the configuration of a cube" should be interpreted in similar fashion.

Figure 2:
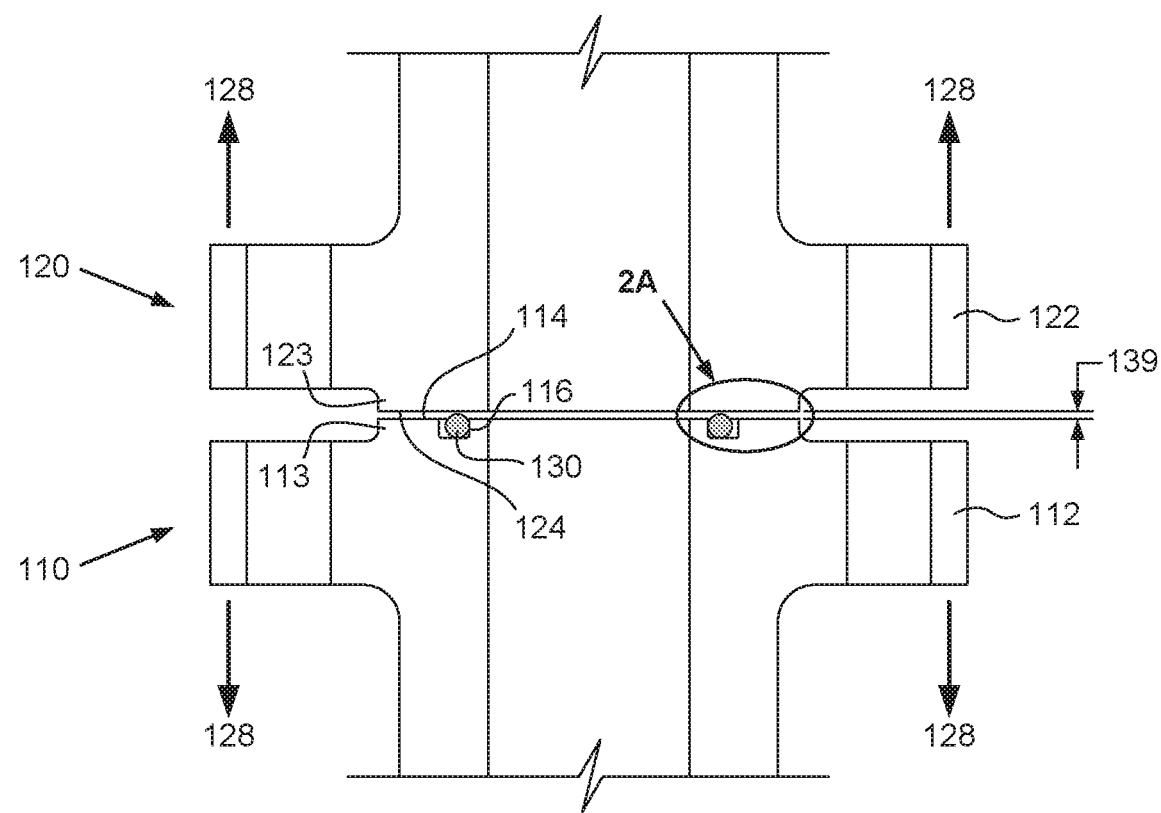
FIG. 2 is a cross-sectional view of the prior art low-spread sealing system configuration shown in FIG. 1 after the pressure-retaining components have been disassembled and spread apart.
Figure 2A:
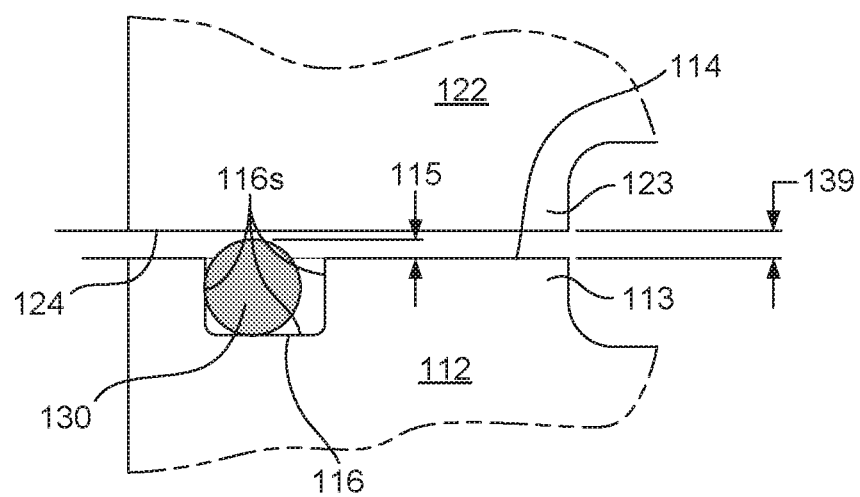
FIG. 2A is a close-up cross-sectional view of the sealing area of the assembly shown in FIG. 2.

Furthermore, it should be understood that, unless otherwise specifically indicated, any relative positional or directional terms that may be used in the descriptions set forth below—such as "upper," "lower," "above," "below," "over," "under," "top," "bottom," "vertical," "horizontal," and the like—have been included so as to provide additional clarity to the description, and should be construed in light of that term's normal and everyday meaning relative to the depiction of the components or elements in the referenced figures. For example, referring to the cross-sectional view of the connection assembly depicted in FIG. 1, it should be understood that the second pressure-retaining component 120 is depicted as being positioned "above" the first pressure-retaining component 110, and the front face 114 of the first connection 112 is positioned "below" the front face 124 of the second connection 122. Additionally, the term "vertical" should be understood as being substantially perpendicular to the front faces 114, 124 of the respective first and second connections 112, 122, whereas the term "horizontal" should be understood as being substantially parallel to the front faces 114, 124. Similarly with respect to the cross-sectional view of the connection assembly illustrated in FIG. 2, it should also be understood that an "upper" portion of the metal ring gasket 160 is positioned in the ring groove 156 that is machined in the front face 154 of the second connection 152, whereas a "lower" portion of the metal ring gasket 160 is positioned in the ring groove 146 that is machined in the front face 144 of the first connection 142.

Generally, the subject matter disclosed herein is directed to novel metal ring gaskets and metal-to-metal sealing systems that require a low amount of spread distance for removing pressure-retaining components. In particular, FIGS. 7A-20 depict various aspects of some illustrative embodiments of a low-spread metal ring gasket, as well as various aspects of metal-to-metal sealing systems that utilize such low-spread metal ring gaskets and require a low amount of spread distance for removing pressure-retaining components, as will be discussed in detail below.

Figure 7A:
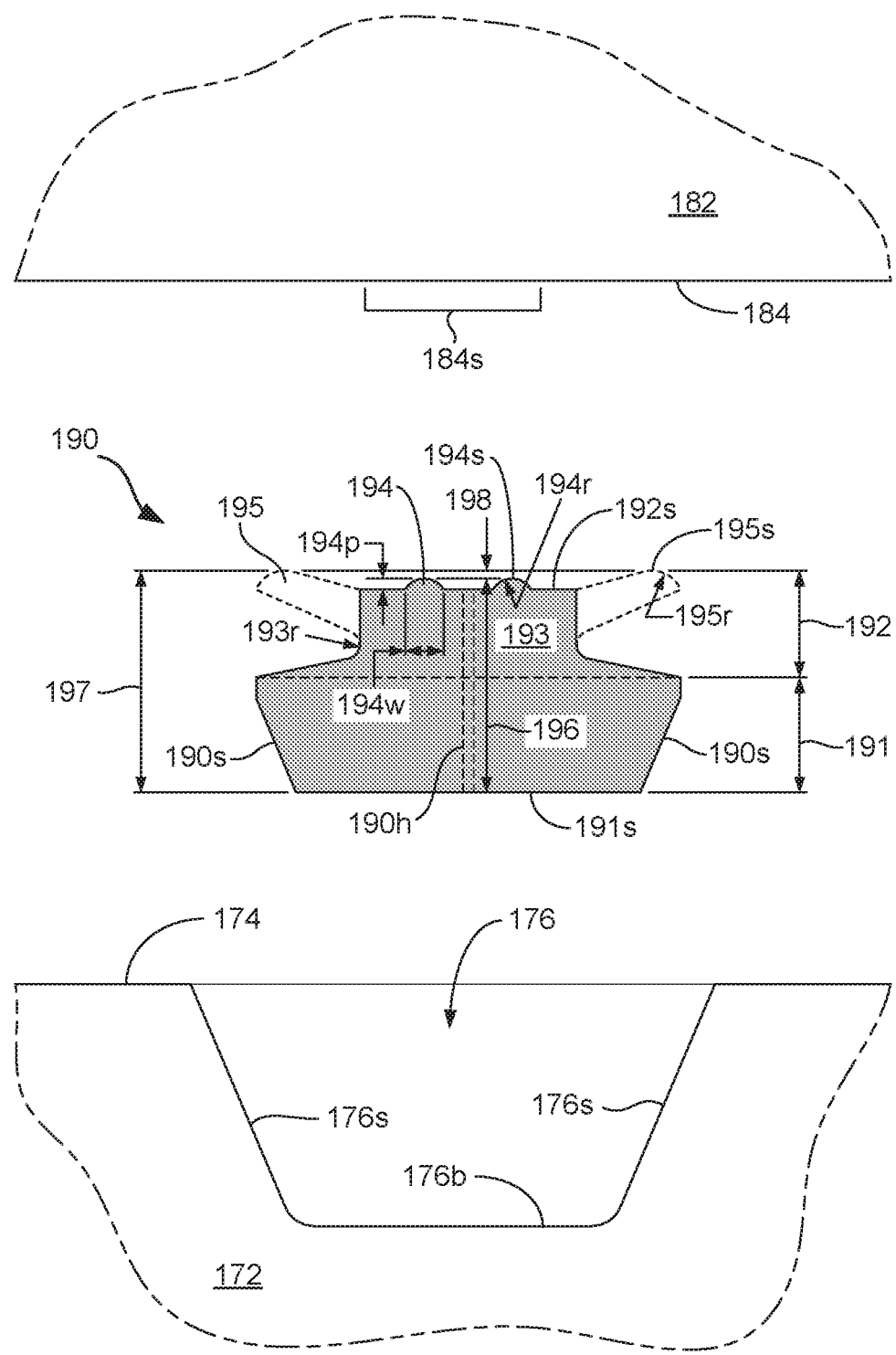
FIG. 7A is an exploded cross-sectional view of an exemplary low-spread metal ring gasket in accordance with some illustrative embodiments of the present disclosure.

FIG. 7A shows an exemplary embodiment of a low-spread metal ring gasket 190 in accordance with the present disclosure. For drawing clarity, the low-spread metal ring gasket 190 has been depicted in an exploded view relative to the front face 174 and ring groove 176 of a first connection 172 (see, FIG. 8) and relative to the front face 184 of a mating second connection 182 (see, FIG. 8).

With continuing reference to FIG. 7A, the low-spread metal ring gasket 190 may include a lower ring gasket portion 191 and an upper ring gasket portion 192. The lower ring gasket portion 191 is adapted to be installed into the ring groove 176 that is formed in the front face 174 of the first connection 172 (see, FIG. 8). The lower ring gasket portion 191 has sealing surfaces 190s that extend upward from the bottom surface 191s of the low-spread metal ring gasket 190 and are positioned on opposing inner and outer sides of the lower ring gasket portion 191 relative to the axis of revolution/central axis of the low-spread metal ring gasket 190. Furthermore, the opposing inner and outer sealing surfaces 190s are adapted to create a pressure-tight metal-to-metal seal against corresponding the inner and outer sidewall sealing surfaces 176s of the ring groove 176 during a connection assembly operation, as will be further described in conjunction with FIGS. 7B-7D below. In certain embodiments, the low-spread metal ring gasket 190 may also have an appropriately positioned pressure-passage hole 190h that passes continuously through the lower and upper ring gasket portions 191, 192 from the bottom surface 191s to the upper surface 192s.

In some illustrative embodiments, the upper ring gasket portion 192 may be configured to include a boss 193 that extends upward from the lower ring gasket portion 191. Additionally, the upper ring gasket portion 192 may include one or more sealing bumps 194 (two shown in FIG. 7A) that protrude out of the upper surface 192s of the low-spread metal ring gasket 190 by a sealing bump projection distance 194p. The projection distance 194p by which the sealing bumps 194 protrude above the upper surface 192s may vary depending on the particular design parameters of the low-spread metal ring gasket 190, such as design pressure and temperature, size of the assembly, the maximum amount of preload generated during gasket ring seating operations, and the like. For example, the projection distance 194p may be approximately 0.020" to 0.075" (0.51 mm to 1.91 mm), although it should be appreciated that other projection distances 194p, either larger or smaller, may be also used, depending on the specific application and sealing system design requirements. Each sealing bump 194 has a sealing surface 194s that is adapted to create a pressure-tight seal against a sealing surface 184s on the front face 184 of the mating second connection 182 (see, FIG. 8) when the sealing bump sealing surface 194s is compressed against the sealing surface 184s and subsequently elastically and/or plastically deformed during a connection assembly operation, as will be further described in conjunction with FIGS. 7B-7D below. In certain embodiments, the sealing surface 184s is a substantially flat sealing surface that is oriented substantially parallel to the front face 184 of the second connection 182, which is in turn also oriented substantially parallel to the front face 174 of the first connection 172 when the first and send connections 172, 182 are in the assembled configuration.

The sealing bumps 194 may be of any suitable shape that is appropriate for affecting the required metal seal against the sealing surface 184s. For example, in some embodiments, the shape of each sealing bump 194 when viewed in cross-section may be substantially that of a circular segment having a substantially circular radius 194r, as is depicted in FIG. 7A. In other embodiments, the shape of each sealing bump 194 when viewed in cross-section may be that of a substantially elliptical segment having an appropriately shaped surface geometry, depending on the specific seal design parameters. Furthermore, as shown in FIG. 7A, the sealing bumps 194 may have a sealing bump width 194w that extends across the upper surface 192s of the low-spread metal ring gasket 190, the size of which may also depend on the specific system sealing design parameters previously mentioned with respect to the projection distance 194p above. For example, in at least some embodiments, the sealing bump width 194w may range between approximately 0.040" and 0.115" (1.0 mm to 2.92 mm). However, it should be understood that the sealing bumps 194 are not limited to the circular/elliptical cross-sectional configurations depicted in FIG. 7A and described herein, nor are they limited to the projection distances 194p or sealing bump widths 194w noted above. Instead, other sealing bump cross-sectional shapes, sealing bump projection distances 194*p*, and sealing bump widths 194*w* may also be selected, based on the particular application and sealing system design requirements, as will be further described below in conjunction with FIGS. 16-20.

In certain exemplary embodiments, the upper ring gasket portion 192 may also include sealing bump protection flanges 195 (sometimes referred to hereinafter as "sealing bump protection wings 195") or simply "protection wings 195") that extend laterally and angularly upward from opposing sides of the boss 193, as is shown by dashed lines in FIG. 7A. The protection wings 195 are adapted to protect the sealing bumps 194 during the removal of a component from a connection, and/or the installation of a new or replacement component. See, e.g., FIG. 10, described below. Additionally, in some embodiments the protection wings 195 may be adapted to affect a secondary seal against the front face 184 of the second mating connection 182, as will also be further described below.

In order for the protection wings 195 to protect the sealing bumps 194 during the removal of a component from a connection, the uppermost point of the sealing bumps 194 must be recessed relative to the uppermost point of the protection wings 195. Stated another way, the uppermost point of the protection wings 195 must extend to a greater relative height than does the uppermost point of the sealing bumps 194. Therefore, when protection wings 195 are utilized with a low-spread metal ring gasket 190 of the present disclosure, the low-spread metal ring gasket 190 may be configured so that the uppermost point of the sealing bump sealing surfaces 194*s* of the sealing bumps 194 is at a height 196 above the bottom surface 191*s* of the low-spread metal ring gasket 190, and so that the uppermost point of the upper surfaces 195*s* of the protection wings 195 is at a height 197 above the bottom surface 191*s* that is greater than the height 196. Such a configuration thus leaves a "gap" 198 between a plane that includes the uppermost points of the wing upper surfaces 195*s* and a plane that includes the uppermost points of the sealing bump sealing surfaces 194*s*. In certain exemplary embodiments, the size of the gap 198 may be in the range of approximately 0.015" to 0.105" (0.38 mm to 2.67 mm), although it should be appreciated that either larger or smaller gap sizes may also be used, depending on the particular application and sealing system design requirements.

For those embodiments in which the low-spread metal ring gasket 190 includes protection wings 195, the upper surface 195*s* of each protection wing 195 is adapted to contact the front face 184 of the mating second pressure retaining component 180 during the connection assembly operation. Furthermore, the protection wings 195 are adapted to flex/bend so that the sealing surface 184*s* can come into contact with and compress the sealing surfaces 194*s* of the sealing bumps 194 as the connection is assembled and the low-spread metal ring gasket 190 is fully seated. See, e.g., FIGS. 7B-7D and the description thereof set forth below. Accordingly, in at least some embodiments, the upper surface 195*s* of each protection wing 195 may have a suitably curved shape, for example, having a radius 195*r*, so as to avoid undue damage to the front face 184 during the connection assembly operation. Additionally, the curved upper surface 195*s* may act to substantially prevent, or at least lessen, any damage to the front face 184 or sealing surface 184*s* of the second connection 182 should the protection wings 195 contact these surfaces during removal and/or installation of a component. Furthermore, a relief radius 193*r* may be used at the transition between the inner and outer side surfaces of the boss 193 and the lower surface of each protection wing 195 so as to avoid high stress concentrations due to the bending stresses imposed on the protection wings 195 during the connection assembly process.

Depending on the particular application, the lower ring gasket portion 191 may be configured so as to substantially conform to the same configuration as that of a lower portion of any standard metal ring gasket known in the art. For example, in at least some embodiments the lower ring gasket portion 191 may substantially conform to the configuration of the lower portion of any one of the standard ring gaskets specified in ANSI/API Specification 6A, such as a Type R ring gasket, a Type RX pressure-energized ring gasket, or a Type BX pressure-energized ring gasket, or it may conform to the configuration of the lower portion if a Type R oval or octagonal ring gasket as specified in ASME B16.20. In other embodiments, the lower ring gasket portion 191 may have a specially designed or nonstandard configuration, as may be dictated by the specific design parameters for the connection assembly, the equipment type, the equipment service, and the like. Furthermore, it should be understood by those of ordinary skill after a complete reading of the present disclosure that such "specialized" configurations of the lower ring gasket portion 191 can readily be adapted to work with any of various upper ring gasket portions 192 disclosed herein so as to form an appropriately designed low-spread metal ring gasket 190 for a metal-to-metal sealing system.

For illustrative purposes only, the lower ring gasket portion 191 of the low-spread metal ring gasket 190 shown in FIGS. 7A-10 has been depicted to substantially conform to the configuration of a lower portion of a typical Type BX pressure-energized ring gasket according to ANSI/API Specification 6A. Additionally, it should be noted that when the configuration of the lower ring gasket portion 191 is intended to conform to that of any standard ring gasket in accordance with ANSI/API Specification 6A, such configuration may be referred to in shorthand fashion in the following description and in appended claims as conforming to the configuration of an "API ring gasket." Furthermore, when the configuration of the lower ring gasket portion 191 is intended to conform to that of a Type BX pressure-energized ring gasket according to ANSI/API Specification 6A, it may be referred to in a like shorthand fashion in the following description and in the appended claims as conforming to the configuration of an "API BX ring gasket." Similar shorthand references may also be made in the following description and in the appended claims to Type R ring gaskets or Type RX pressure-energized ring gaskets according to ANSI/API Specification 6A, as well as to Type R oval or octagonal ring gaskets according to ASME B16.20. It should be understood, however, that the reference to or use of such shorthand terms is for convenience only, and therefore should not be construed as limiting in any way to the subject matter disclosed herein.

The low-spread metal ring gasket 190 disclosed herein may be manufactured from any one of several typical metallic materials that are commonly used for such metal ring gaskets. For example, depending on the specific design conditions (e.g., pressure and temperature), process service conditions (e.g., contained fluid medium, corrosive, and/or sour service), and/or operating environment (e.g., subsea), the low-spread metal ring gasket 190 may be a low alloy steel such as a chromium-molybdenum (Cr—Mo) steel, an alloy steel such as stainless steel (e.g., 316 stainless steel), or a high alloy steel such as a nickel alloy, (e.g., an Inconel® alloy), and the like. Of course, this is a non-limiting list of material types, as other appropriately specified materials may also be used.

Figure 7B:
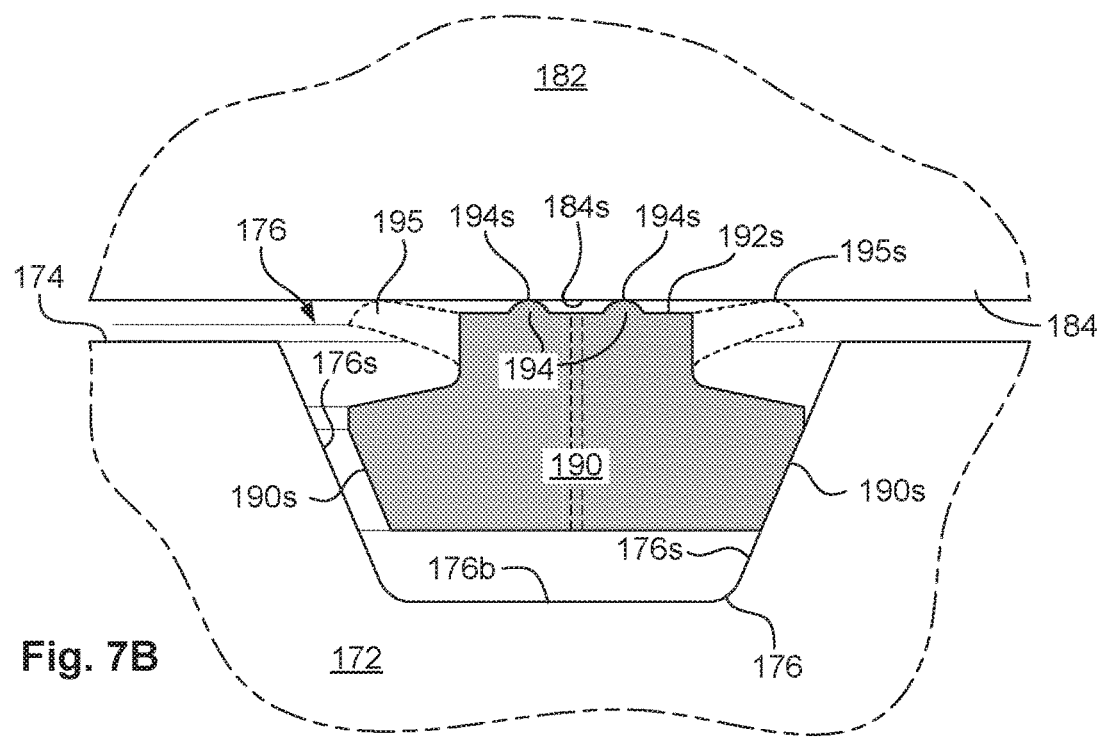
FIG. 7B is a cross-sectional view of the illustrative low-spread metal ring gasket shown in FIG. 7A and the adjacent sealing areas of mating connections after an initial fit-up of the low-spread metal ring gasket with mating connections and prior to full tightening and seating of the low-spread metal ring gasket.
Figure 8:
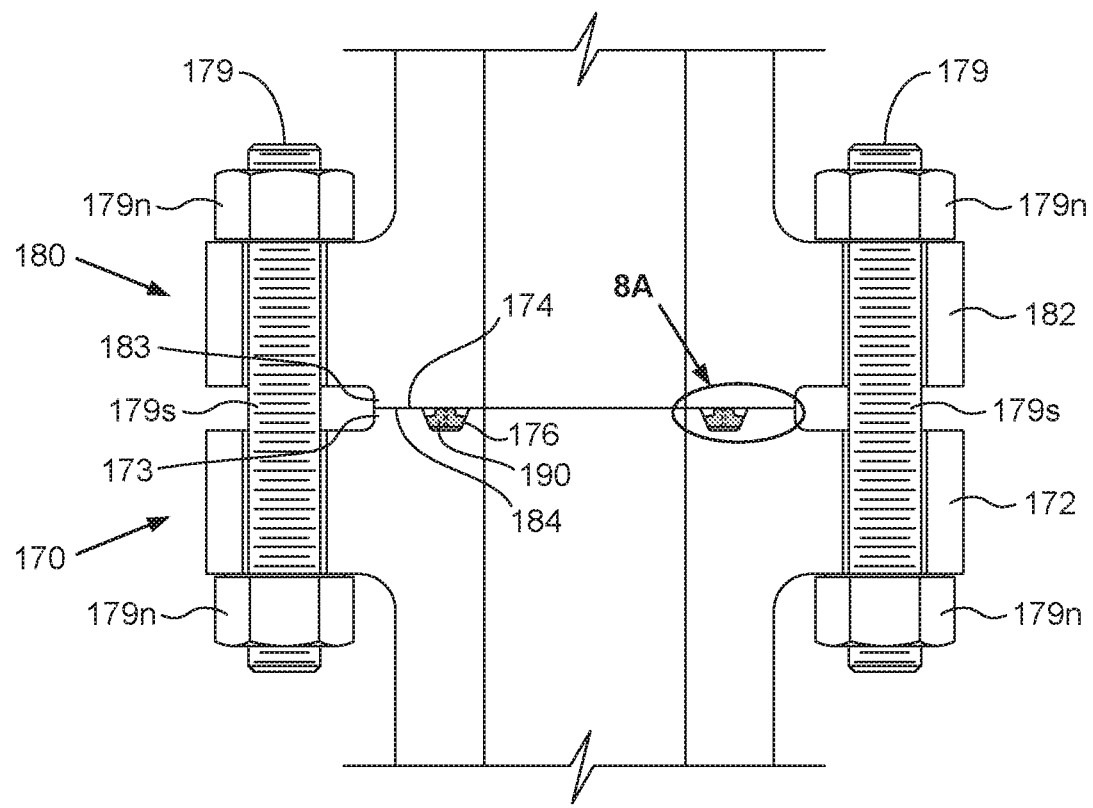
FIG. 8 is a cross-sectional view of an exemplary assembled low-spread metal-to-metal sealing system configuration in accordance with an embodiment of the present disclosure.

FIG. 7B depicts the illustrative low-spread metal ring gasket 190 of FIG. 7A after it has been initially fit-up with the first and second mating connections 172, 182 (see, FIG. 8). As shown in FIG. 7B, the low-spread metal ring gasket 190 has been positioned between the first and second connections 172, 182 and partially inserted inside of the ring groove 176, such that the outer side sealing surface 190s on the lower ring gasket portion 191 (that is, the sealing surface 190s depicted on the right-hand side of FIG. 7B) is in contact with the corresponding outer sidewall sealing surface 176s of the ring groove 176 (also shown on the right-hand side of FIG. 7B). In some embodiments, the inner side sealing surface 190s on the lower ring gasket portion 191 (that is, the sealing surface 190s depicted on the left-hand side of FIG. 7B) may be slightly spaced apart from the corresponding inner sidewall sealing surface 176s of the ring groove 176 (also shown on the left-hand side of FIG. 7B), as would typically be expected of a lower ring gasket portion 191 that substantially conforms to the configuration of a standard API BX ring gasket.

With continuing reference to FIG. 7B, the entirety of the lower ring gasket portion 191 is inside of the ring groove 176, that is, positioned below the level of the front face 174 of the first connection 172, and a lower part of the upper ring gasket portion 192 is also positioned within the ring groove 176 (i.e., below the level of the front face 174). However, as shown in FIG. 7B, an upper part of the upper ring gasket portion 192 protrudes out of the ring groove 176 (i.e., above the level of the front face 174). In particular, while at least a lower portion of the boss 193 is positioned with the ring groove 176, the entirety of each sealing bump 194 may be positioned outside of the ring groove 176 (i.e., above the level of the front face 174) so that the sealing bump sealing surfaces 194s can be contacted by the sealing surface face 184s during a connection assembly operation. In certain embodiments, an upper portion of the boss 193 may also protrude out of the ring groove 176 and above the level of the front face 174, as is depicted in FIG. 7B. Furthermore, in those exemplary embodiments wherein the low-spread metal ring gasket 190 includes protection wings 195, a lower portion of each protection wing 195 may also be positioned in the ring groove 176 (i.e., below the level of the front face 174), whereas an upper portion of the protection wings 195 may protrude out of the ring groove 176 and above the level of the front face 174.

During the initial fit-up, the front face 184 of the second connection 182 may be positioned adjacent to the front face 174 of the first connection 172 such that the sealing surface 184s on the front face 184 is in contact with the sealing surfaces 194s of the sealing bumps 194, as is shown in FIG. 7B. Furthermore, when the low-spread metal ring gasket 190 includes the protection wings 195, the front face 184 also contacts the wing upper surfaces 195s and flexes/deflects the protection wings 195 downward toward the bottom surface 191s of the low-spread metal ring gasket 190 so that the sealing surface 184s can move into contact with the sealing bump sealing surfaces 194s, as is depicted in FIG. 7B. In certain other embodiments, the protection wings 195 may be designed so as to be stiff enough to substantially prevent the sealing surface 184s from contacting the sealing bumps 194 until a sufficiently high preload is imposed on the assembly connections 172, 182 when fully seating the low-spread metal ring gasket 190 (see, FIG. 7C, described below). In such embodiments (not shown in FIG. 7B), a gap—such as the gap 198 shown in FIG. 7A—may be present between the sealing bump sealing surfaces 194s and the sealing surface 184s on the front face 184 of the second connection 182 after initial fit-up and until a preload great enough to flex/deflect the protection wings 195 is imposed on the connections 172, 182.

Figure 7D:
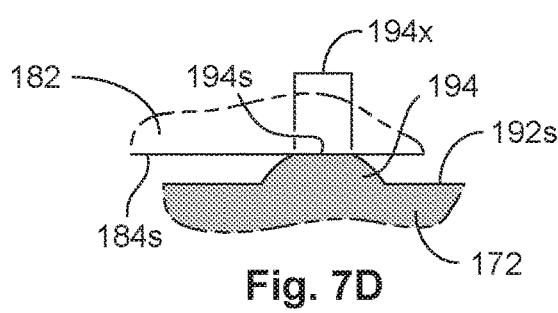
FIG. 7D is a close-up cross-sectional view of a sealing bump of the exemplary low-spread metal ring gasket seated against the adjacent sealing area of the illustrative mating connection shown in FIG. 7C.
Figure 7C:
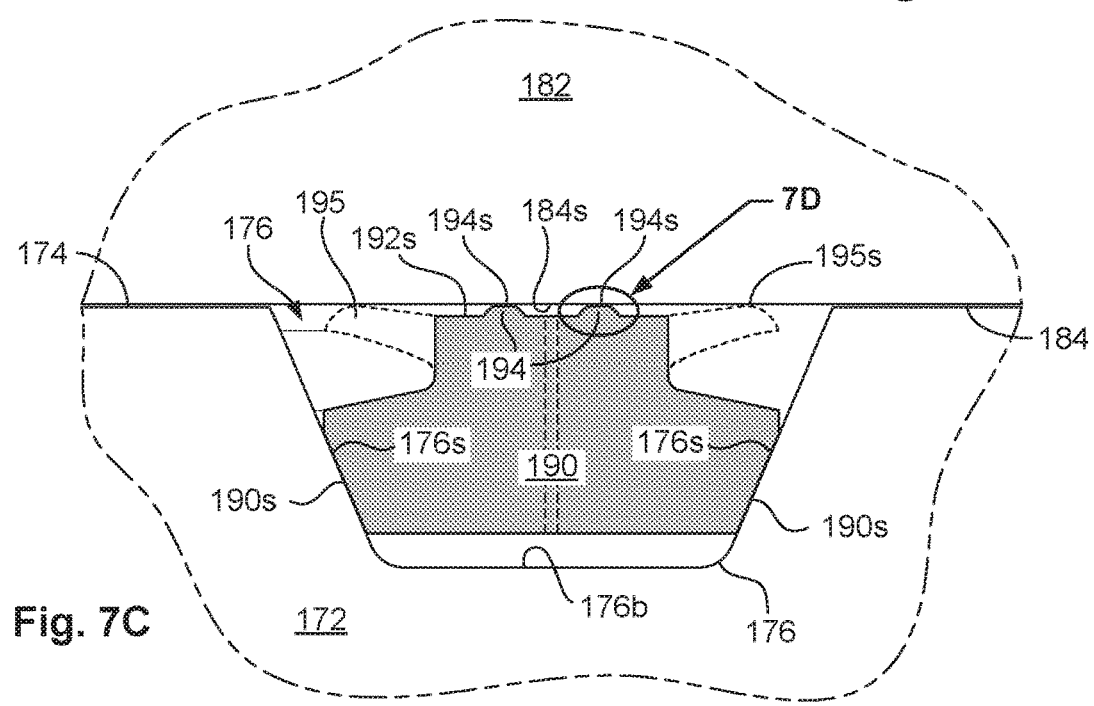
FIG. 7C is a cross-sectional view of the illustrative low-spread metal ring gasket and adjacent sealing areas of the mating connections shown in FIG. 7B after full tightening and seating of the low-spread metal ring gasket between the mating connections.

FIG. 7C shows the low-spread metal ring gasket 190 of FIG. 7B after a seating preload has been imposed on the first and second mating connections 172, 182 (see, FIG. 8) so as to fully seat the low-spread metal ring gasket 190 in the ring groove 176 of the first connection 172 and against the sealing surface 184s of the second connection 182. As shown in FIG. 7C, an upper portion of each sealing bump 194 has been compressed against the sealing surface 184s and plastically deformed during the ring gasket seating operation so as to have a least a partially flattened surface, thus creating a pressure-tight metal-to-metal seal between the sealing bumps 194 and the sealing surface 184s. Additionally, the lower ring gasket portion 191 has been pushed downward toward the bottom 176b ring groove 176, and in the process, both the inner and outer side sealing surfaces 190s of the lower ring gasket portion 191 have formed a pressure-tight seal against the corresponding inner and outer sidewall sealing surfaces 176s of the ring groove 176. Furthermore, in certain embodiments, the low-spread metal ring gasket 190 may be compressed within the ring groove 176 until the front face 174 of the first connection 172 has been brought into contact with the front face 184 of the second connection 182, such as would typically be the case with connections that utilize a Type BX ring gasket in accordance with ANSI/API Specification 6A. However, it should be appreciated that Specification 6A makes it clear that such face-to-face contact is not necessary for a Type BX ring gasket to create a properly functioning seal. The low-spread metal ring gasket 190 that is shown in the fully seated condition depicted in FIG. 7C may therefore be illustrative of an embodiment wherein the lower ring gasket portion 191 of the low-spread metal ring gasket 190 conforms to the configuration of, for example, an API BX ring gasket.

As noted above, in those embodiments that employ the use protection wings 195, the protection wings 195 are deflected downward by the front face 184 of the second mating connection 182 so that the sealing surface 184s can contact and compress the sealing surface 194s of the sealing bumps 194 the when affecting the metal-to-metal seal between the sealing bumps 194 and the sealing surface 184s under the seating preload. The protection wings 195 may also be deflected toward and at least partially into the ring groove 176 during the ring gasket seating operation as the lower ring gasket portion 191 is pushed downward toward the bottom 176b ring groove 176 and the sealing bumps 194 are compressed and seated against the sealing surface 184s. Furthermore, depending on the design and stiffness/flexibility of the protection wings 195 and the magnitude of the contact load that is generated between the upper surfaces 195s of the protection wings 195 and the front face 184 of the second connection 182 (see, FIG. 8) during the ring gasket seating operation, the protection wings 195 may also provide a secondary, or backup, metal-to-metal seal. It should be understood, however, that such secondary or backup sealing may not be the primary function of the protection wings 195.

As is also mentioned above, in certain exemplary embodiments the front face 174 of the first connection 172 may typically be brought into direct (face-to-face) contact with the front face 184 of the mating second connection 182 (see, FIG. 8) during the ring gasket seating operation, in which case the entirety of each protection wing 195 would be deflected downward and into the ring groove 176. Nonetheless, such face-to-face contact is not necessary for the lower ring gasket portion 191 (e.g., a ring gasket configuration in accordance with an API BX ring gasket standard) of the low-spread metal ring gasket 190 to be fully and properly seated, nor would it be necessary for the sealing bumps 194 to create an appropriate metal-to-metal seal against the sealing surface 184s. Accordingly, the front faces 174 and 184 have been depicted in FIG. 7C as having a very slight standoff, thus providing additional clarity to the various elements illustrated therein.

FIG. 7D is a close-up cross-sectional view of one of the two exemplary sealing bumps 194 of the exemplary low-spread metal ring gasket 190 as shown in FIG. 7C, wherein the sealing surface 194s of the sealing bump 194 has been seated against the adjacent sealing surface 184s on the front face 184 of the second connection 182. As shown in FIG. 7D, a region 194x of the sealing bump 194 has been contacted and compressed by a corresponding region of the sealing surface 184s. In the illustrative embodiment of FIG. 7D, the contact region 194x of the sealing bump 194 has been depicted as being substantially flattened against the sealing surface 184s on the front face 184, although it should be appreciated by those of ordinary skill that the actual profile of the contact region 194x when in the seated configuration would depend on a variety of different design and assembly parameters. Such parameters may include, for example, the magnitude of the seating preload, the size of the seating bumps 194 (e.g., width 194w and/or radius 194r), the relative material hardnesses of the mating elements (i.e., the hardness of the material of the low-spread metal ring gasket 190 as compared to the hardness of the material of the second connection 182 or the hardness of any overlay/facing material on the sealing surface 184s), and the like. As such, in some embodiments the sealing bump 194 and the sealing surface 184s may both experience some amount of elastic and/or plastic local deformation to one degree or another in the as-seated configuration. In other embodiments, deformation in the seating configuration may be limited to one or the other of these two elements.

Figure 8A:
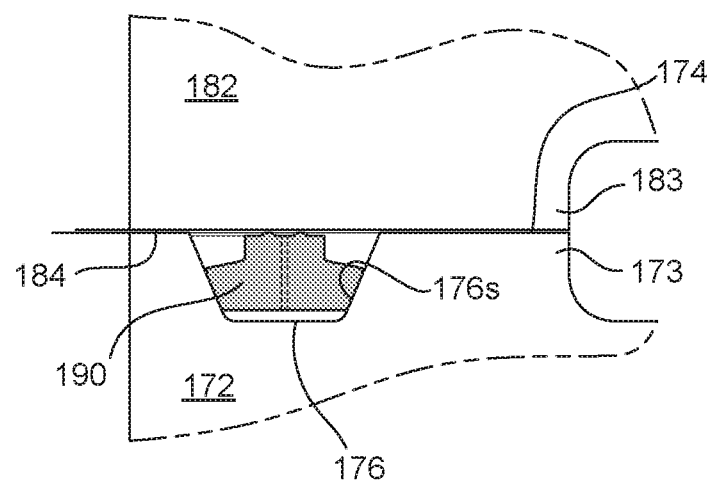
FIG. 8A is a close-up cross-sectional view of the sealing area of the assembly illustrated in FIG. 8.
Figure 9:
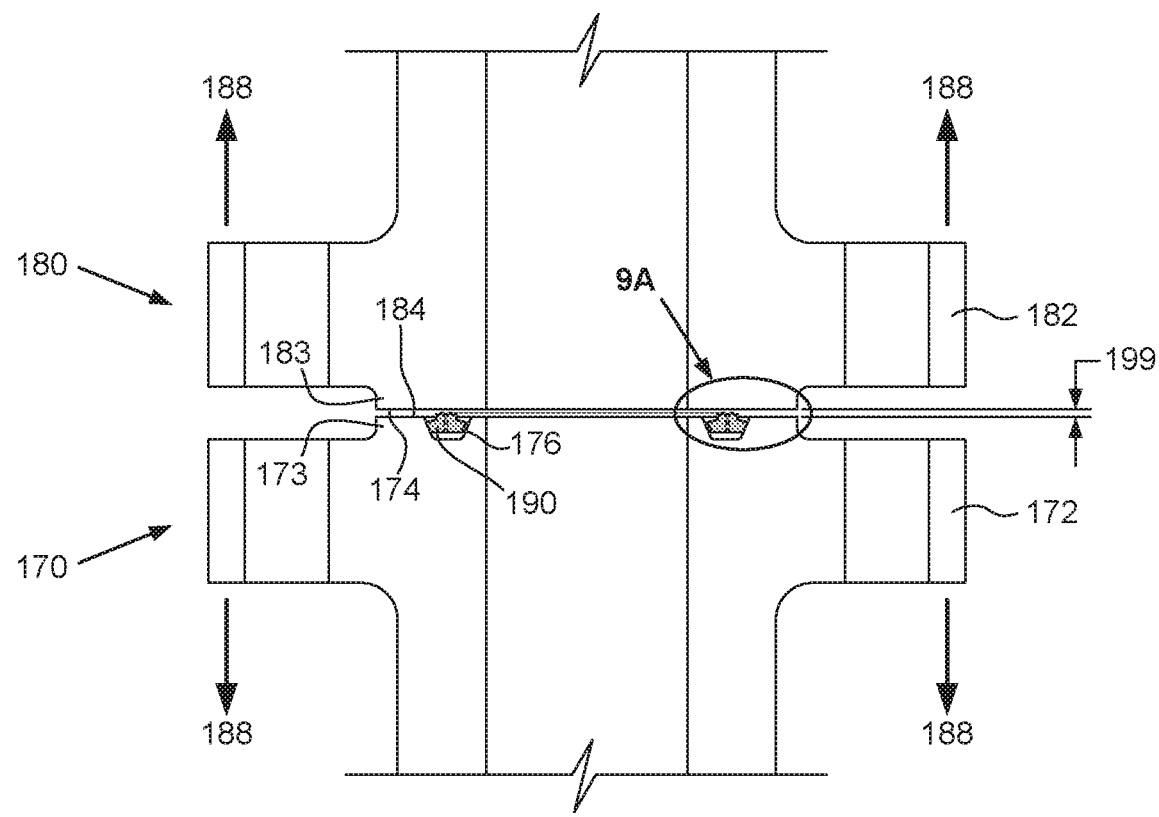
FIG. 9 is a cross-sectional view of the low-spread metal-to-metal sealing system configuration depicted in FIG. 8 after the pressure-retaining components have been disassembled and spread apart.
Figure 10:
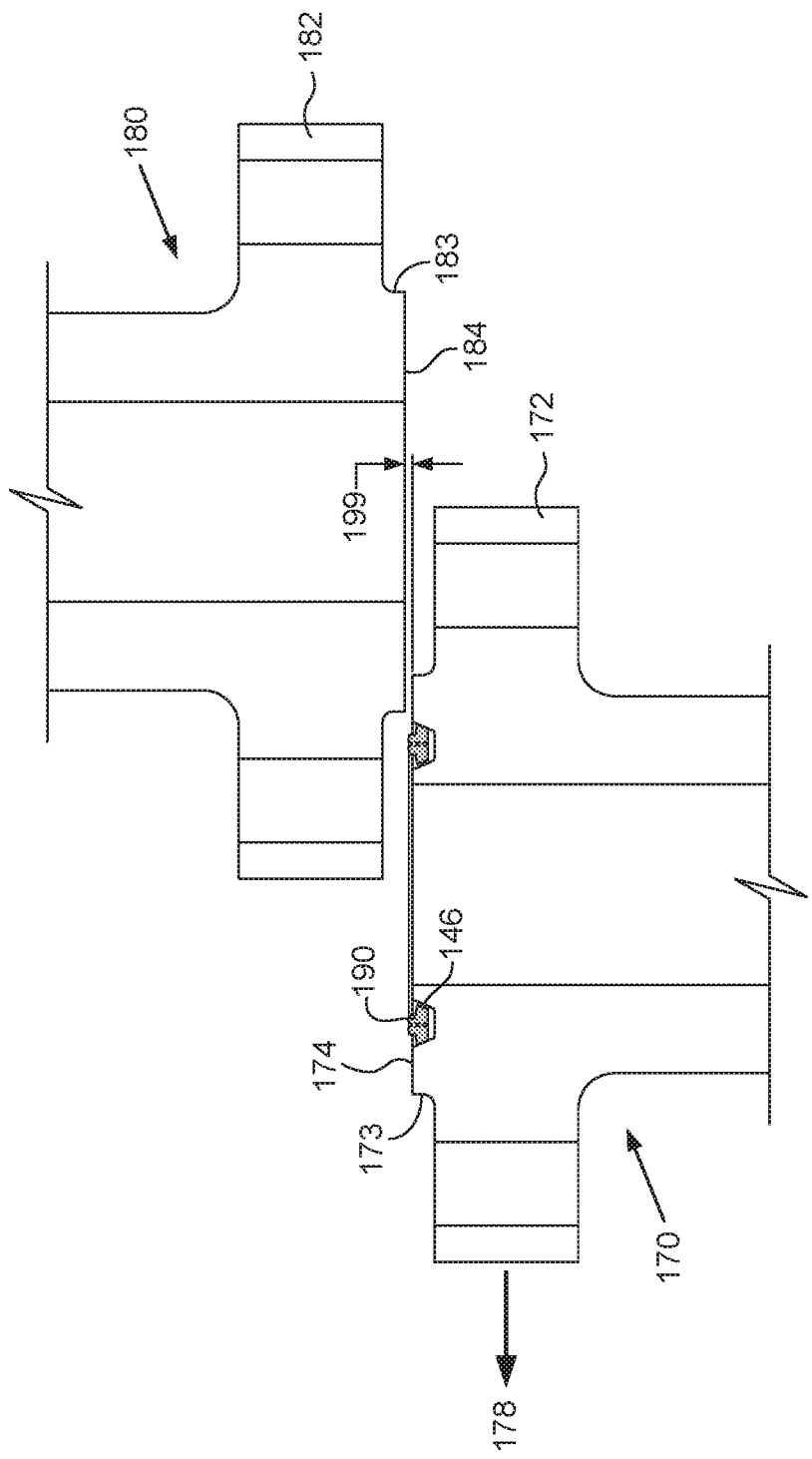
FIG. 10 is a cross-sectional view of the low-spread metal-to-metal sealing system configuration illustrated in FIG. 9 after a first pressure-retaining component has been moved laterally relative to a second pressure-retaining component.

FIGS. 8-10 depict various cross-sectional views of an exemplary low-spread metal-to-metal sealing system configuration during the disassembly of mating pressure-retaining components and the removal of one of the pressure-retaining components from the system, thus illustrating some low-spread aspects of the metal-to-metal sealing system disclosed herein. In particular, FIG. 8 is a cross-sectional view of a low-spread metal-to-metal sealing system in a fully assembled configuration, and FIG. 8A is a close-up detailed cross-sectional view of the sealing area of the assembly illustrated in FIG. 8. It should be appreciated that the illustrative low-spread metal ring gasket 190 shown in FIGS. 8 and 8A may be in accordance with any of the various embodiments of low-spread metal ring gaskets disclosed herein, such as any one of the low-spread metal ring gaskets depicted in FIGS. 11A-13C that are described more fully below. Furthermore, the low-spread metal ring gasket 190 illustrated in FIGS. 8 and 8A is fully seated in a ring groove 176 and against the sealing surface 184s in similar fashion to the low-spread metal ring gasket 190 depicted in FIG. 7C and described above, although the protection wings 195 (shown by dashed lines in FIG. 7C) have not been included in FIGS. 8 and 8A so as to lend additional clarity to the elements depicted. Additionally, for drawing simplicity, not all of the various elements of the low-spread metal ring gasket 190 that are specifically identified in FIGS. 7A-7C have been so identified by reference number in FIGS. 8 and 8A, although it should be understood that, with the exception of the protection wings 195, such elements would be present in at least the illustrative embodiment shown FIGS. 8 and 8A, as well as in other exemplary embodiments of the low-spread metal ring gasket 190 disclosed herein.

As shown in FIG. 8, the low-spread metal-to-metal sealing system includes a first connection 172 of a first pressure-retaining component 170 that is connected to a corresponding second mating connection 182 of a second pressure-retaining component 180 by a plurality of fasteners 189 (shown in FIG. 8 as threaded studs 189s with pairs of threaded heavy hex nuts 189n). While the first and second connections 172 and 182 are shown in FIG. 8 as typical flanged connections, other types of connections known in the art—e.g., clamp connections and the like—may also be used. Furthermore, either of the first and second connections 172 or 182 may be integral to a specific type of pressure-retaining component, such as a valve body, pump housing, etc., or either may be a separate component that is attached to the respective pressure-retaining component 170 or 180 by any means known in the art, such as welding (e.g., a weld neck flange), threading (e.g., a threaded flange or coupling), and the like. Additionally, either one or both of the first and second mating connections 172, 182 may be configured in accordance with any standard know in the art, e.g., ANSI/API Specification 6A, ASME/ANSI B16.5, and the like, or either one or both may be a specially designed connection that is specific to a given application and/or equipment type, or in accordance with an original equipment manufacturer's design standard, etc.

The first and second pressure-retaining components 170, 180 may be any one of a variety known pressure-retaining components that are commonly used in production, processing, manufacturing, and/or refining systems, fluid transport, storage, and/or blending systems, and the like. For example, the first and second pressure-retaining components 170, 180 may be any one of a valve, a pump, a compressor, a pipe or pipe fitting, a processing vessel, a heat exchanger, a filter or strainer, a reactor, a storage or blending tank, etc. It should be appreciated, however, that this list of pressure-retaining components is exemplary and non-limiting, as the low-spread metal With continuing reference to FIG. 8, the first connection 172 may be configured with a raised face 173, wherein the front face 174 of the first connection is located on the front of the raised face 173. The second connection 182 may also be configured with a raised face 183, and the front face 184 may be similarly positioned on the raised 183. As shown in FIG. 8A, the front faces 174, 184 on the respective raised faces 173, 183 of the first and second mating connections 172, 182 are depicted as being separated by the slight standoff distance in similar fashion to the ring gasket preload condition shown in FIG. 7C. However, as noted previously, this standoff configuration is illustrative only, because in some embodiments the front faces 174, 184 may be in direct face-to-face contact, such as when the lower ring gasket portion 191 of the low-spread metal ring gasket 190 conforms to an API Type BX ring gasket.

It should be appreciated by those of ordinary skill after a complete reading of the present disclosure that the particular raised face configurations shown on the first and second mating connections 172, 182, are exemplary only, as other configuration may also be used. For example, depending on the specific assembly design and/or the configuration of the lower ring gasket portion 191 of the low-spread metal ring gasket 190, only one the first and second connections 172, 182 may be configured with a respective raised face, whereas the other connection may be configured with a flat face. Furthermore, both of the first and second connections 172, 182 may be configured with a flat face, depending on the design of the overall assembly and/or the specific configuration of the low-spread metal ring gasket 190, particularly that of the lower ring gasket portion 191.

Figure 9A:
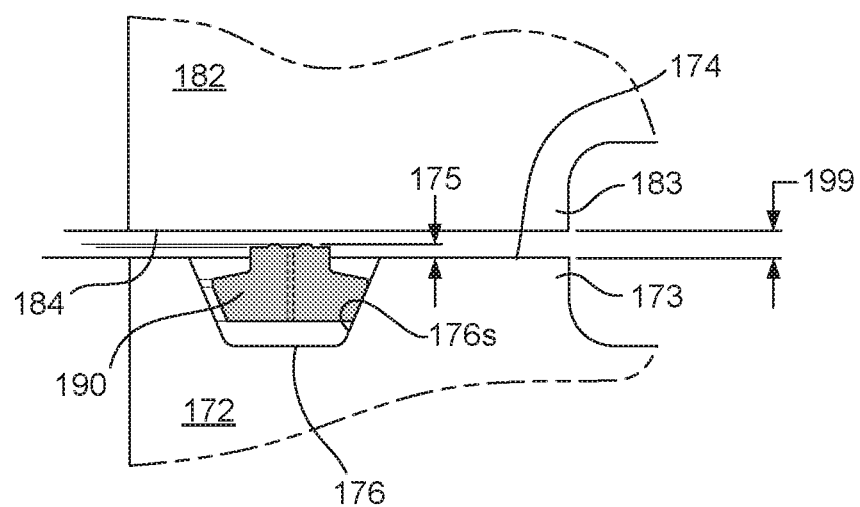
FIG. 9A is a close-up cross-sectional view of the sealing area of the assembly shown in FIG. 9.

FIGS. 9 and 9A are cross-sectional views the low-spread metal-to-metal sealing system shown in FIGS. 8 and 8A, respectively, after the first and second connection 172, 182 of the respective first and second pressure-retaining components 170, 180 and have been disassembled and spread apart (as indicated by the arrows 188) so that the front faces 174, 184 are separated by a clearance distance 199 in anticipation of removing one of the pressure-retaining components 170, 180 from the assembly. Additionally, FIG. 10 shows the assembly of FIG. 9 as the first pressure-retaining component 170 is being laterally moved relative to the second pressure-retaining component 180 (as indicated by the arrow 178), wherein the first pressure-retaining component 140 is being removed from service. 0.041" to 0.225"

Figure 3:
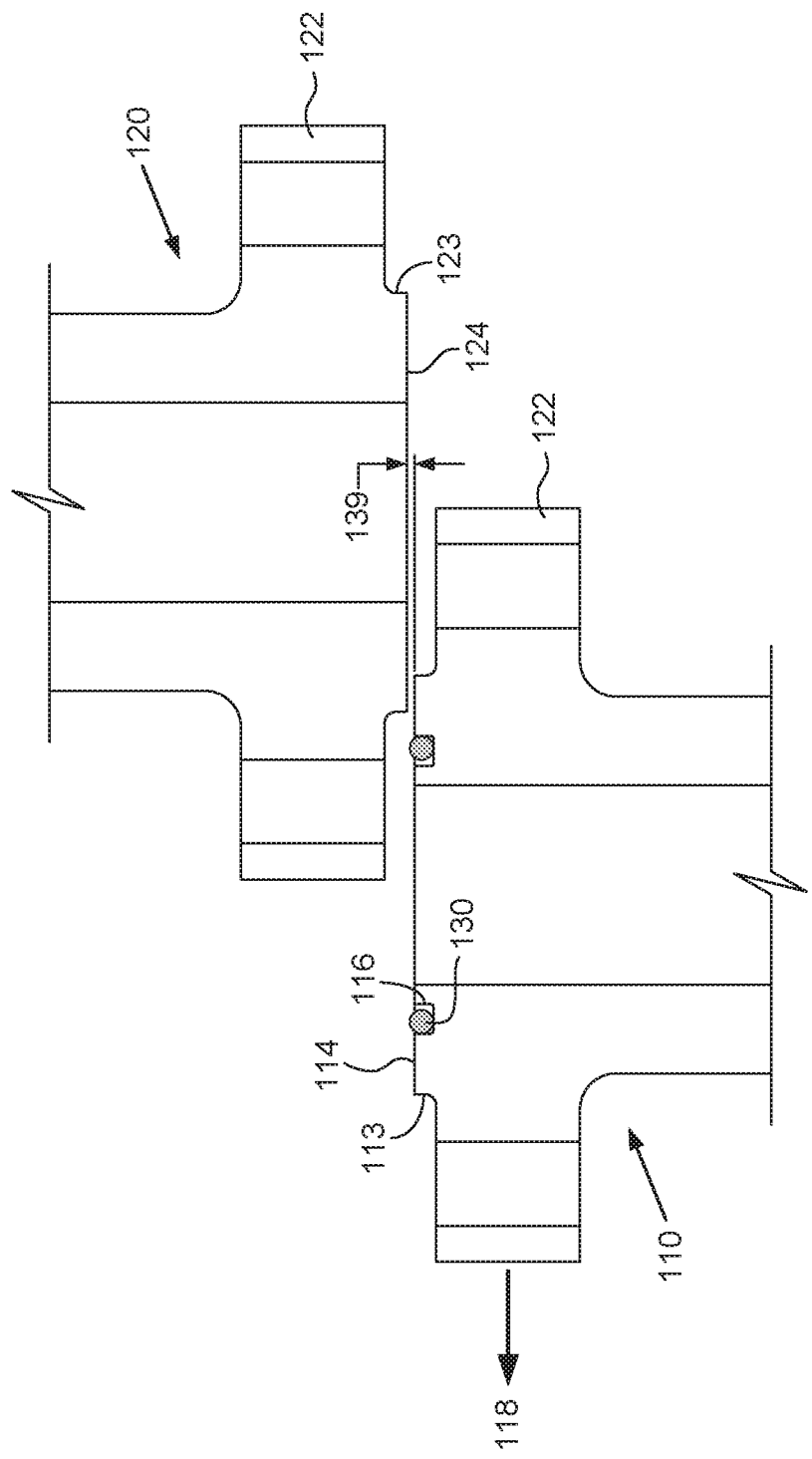
FIG. 3 is a cross-sectional view of the prior art low-spread sealing system configuration illustrated in FIG. 2 after a first pressure-retaining component has been moved laterally relative to a second pressure-retaining component.
Figure 4:
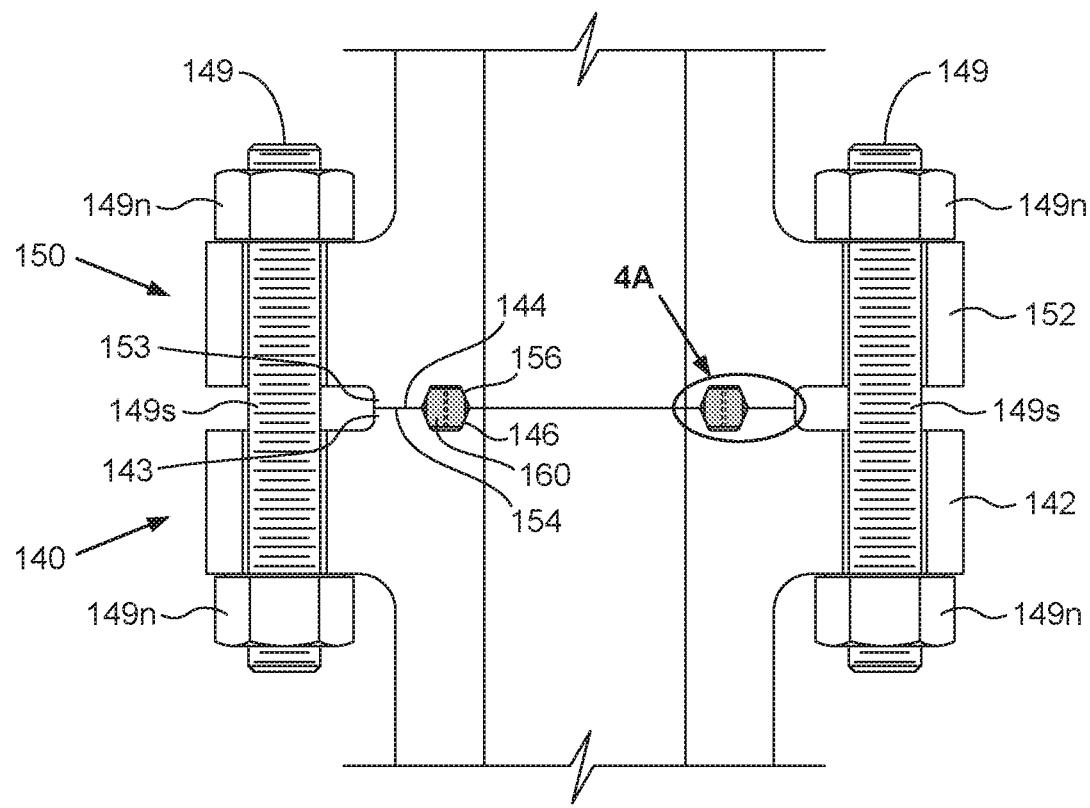
FIG. 4 is a cross-sectional view of an assembled prior art metal-to-metal sealing system configuration.
Figure 4A:
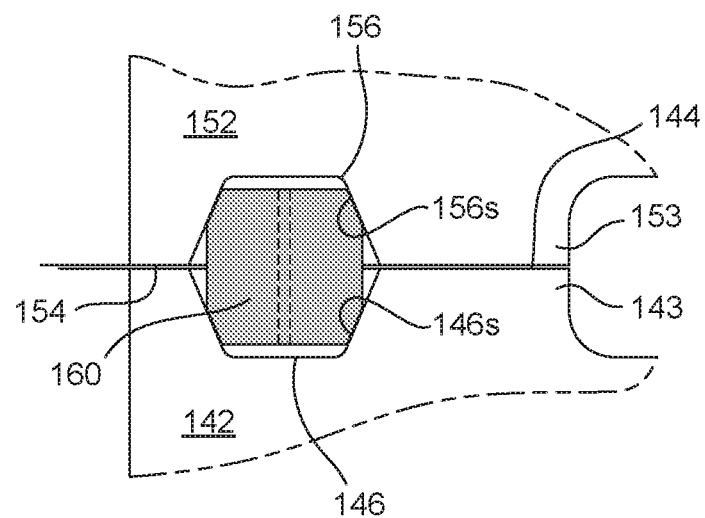
FIG. 4A is a close-up cross-sectional view of the sealing area of the assembly shown in FIG. 4.
Figure 5:
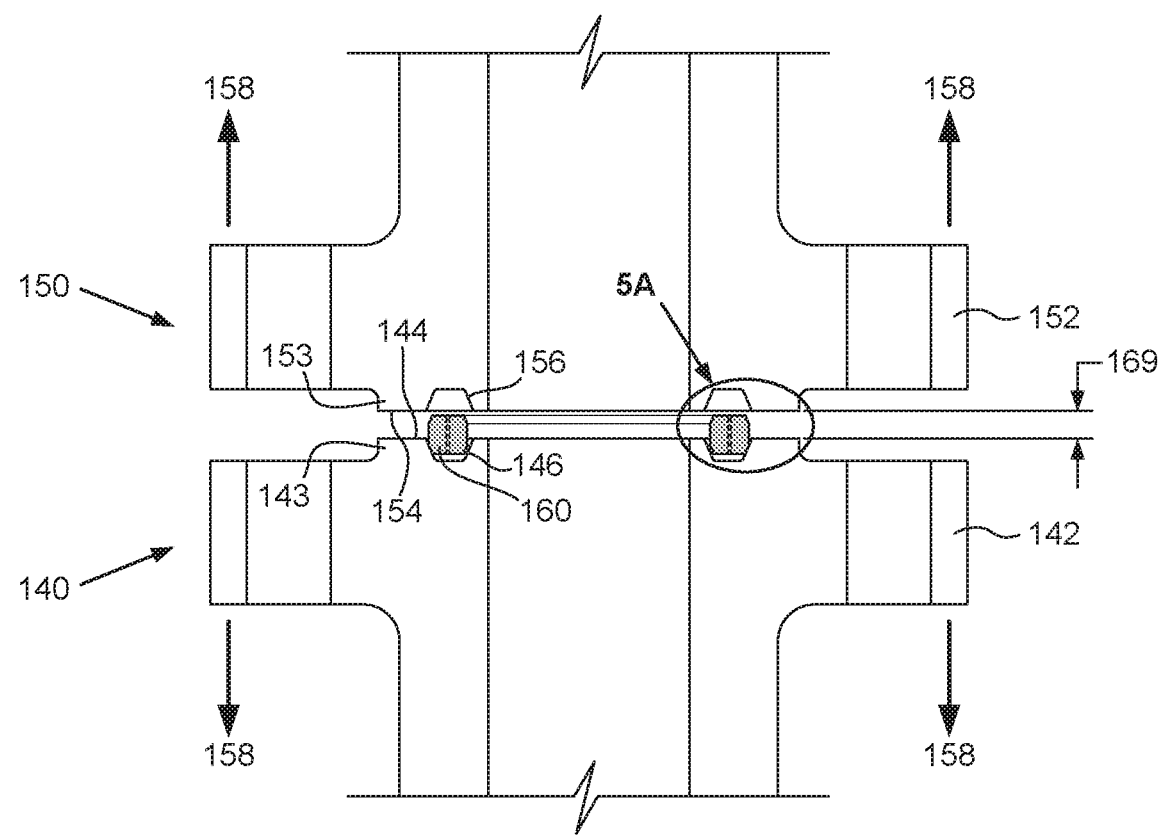
FIG. 5 is a cross-sectional view of the prior art metal-to-metal sealing system configuration illustrated in FIG. 4 after the pressure-retaining components have been disassembled and spread apart.
Figure 5A:
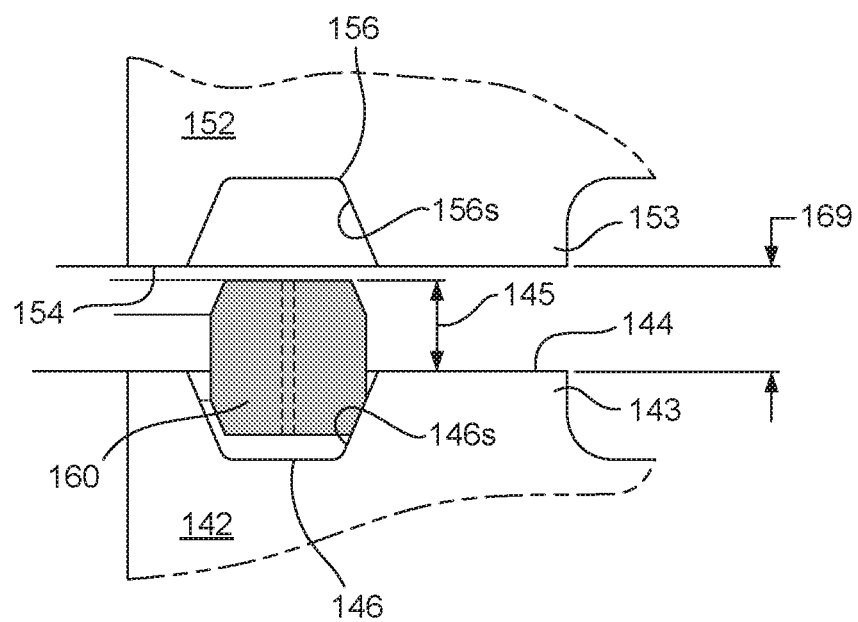
FIG. 5A is a close-up cross-sectional view of the sealing area of the assembly depicted in FIG. 5.
Figure 6:
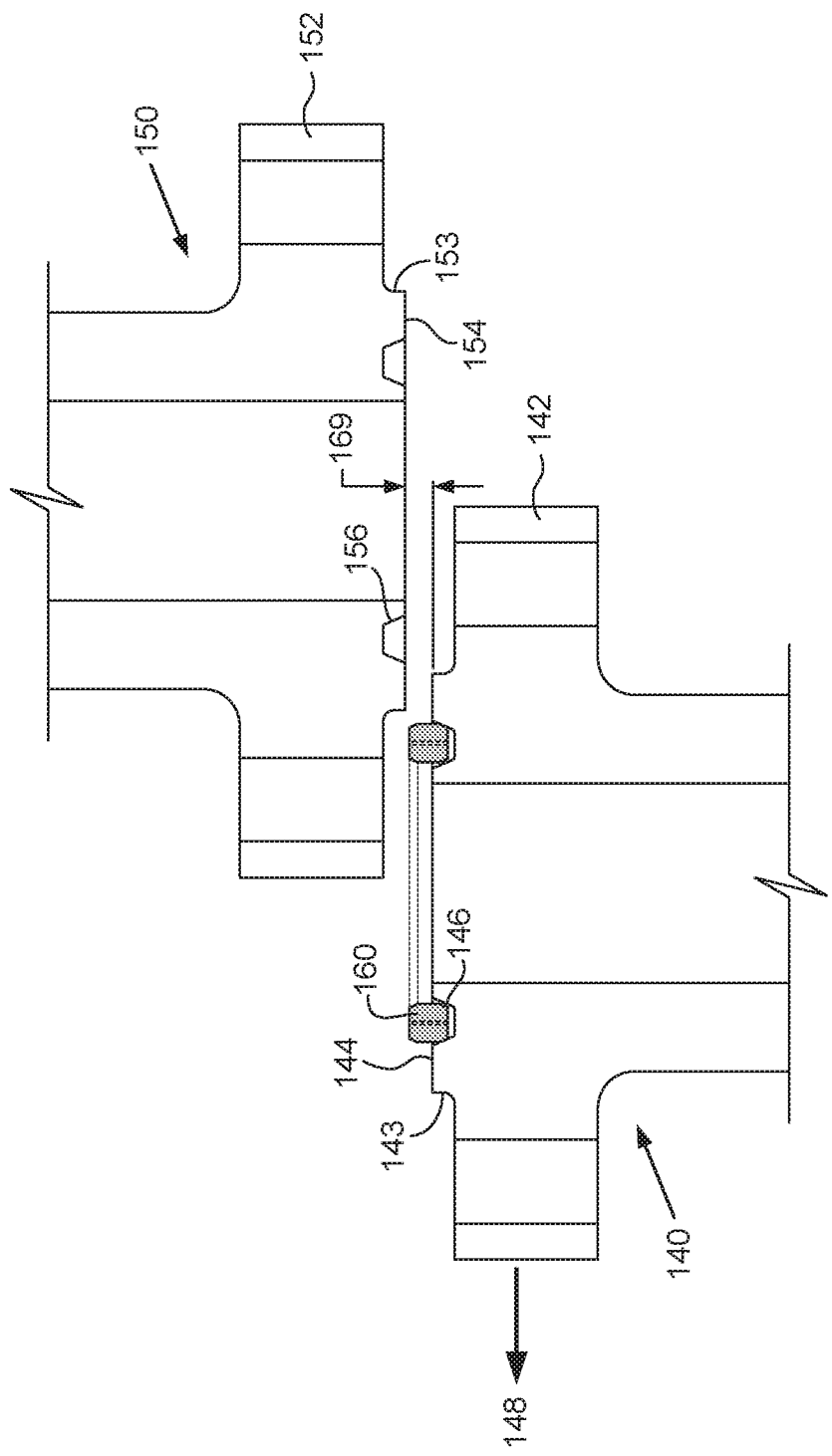
FIG. 6 is a cross-sectional view of the prior art metal-to-metal sealing system configuration shown in FIG. 5 after a first pressure-retaining component has been moved laterally relative to a second pressure-retaining component.

As is shown in the close-up detailed cross-sectional view of FIG. 9A, the low-spread metal ring gasket 190 may protrude out of the ring groove 176 such that its uppermost surfaces extends minimally above the front face 174 of the first connection 172 by a distance 175. Depending on the overall design parameters of the specific application (such as size, design temperature/pressure, etc.), the projection distance 175 may be in the range of approximately 1/16" to 1/8" (1.6 mm to 3.2 mm). Furthermore, the clearance distance 199 between the front faces 174 and 184 that would be sufficient to allow for the removal of one of the two pressure-retaining components 170 or 180 may range between 0.041" to 0.225" (0.38 mm to 2.67 mm, which is significantly less than would be the case for the typical prior art metal-to-metal sealing systems (such as is illustrated in FIGS. 4-6 above), and more in line with the low-spread prior art elastomeric/O-ring system depicted in FIGS. 1-3. It should be understood, however, that these projection and clearance distance ranges are exemplary only, as other distances may result from the specific design criteria of the assembly and/or the actual application.

FIGS. 11A-13C are cross-sectional views of some optional configurations of the exemplary low-spread metal ring gaskets disclosed herein. For example, each of the low-spread metal ring gaskets 190 illustrated in FIGS. 11A-13C include a lower ring gasket portion 191 and an upper ring gasket portion 192, where the lower ring gasket portion 191 is adapted to be installed into a corresponding ring groove (not shown) that is formed in the face of a connection, such as the ring groove 176 that is formed in the front face 174 of the first connection 172 that is shown in FIG. 7A and described above. The lower ring gasket portion 191 has sealing surfaces 190s that extend upward from the bottom surface 191s of the low-spread metal ring gasket 190 and are positioned on opposing inner and outer sides of the lower ring gasket portion 191. Furthermore, the opposing sealing surfaces 190s are adapted to create a pressure-tight metal-to-metal seal against the sealing surfaces of a corresponding ring groove (e.g., the ring groove 176 shown in FIGS. 7A-7C above) during a connection assembly operation, and the upper ring gasket portion 192 is configured to include a boss 193 that extends upward from the lower ring gasket portion 191. Additionally, in each of the embodiments depicted in FIGS. 11A-13C, the upper ring gasket portion 192 includes at least one sealing bump 194 that protrudes upward out of the upper surface 192s of the low-spread metal ring gasket 190 by a sealing bump projection distance 194p. For example, the embodiments shown FIGS. 11A, 12A, and 13A each depict a low-spread metal ring gasket configuration having a single (one) sealing bump 194, whereas the exemplary low-spread metal ring gaskets 190 depicted in FIGS. 11B, 12B, and 13B each have two sealing bumps 194, and FIGS. 11C, 12C, and 13C illustrate low-spread metal ring gasket configurations that utilize three sealing bumps 194. Furthermore, as noted with respect to FIGS. 7A-7D above, any embodiment of the low-spread metal ring gaskets 190 disclosed herein may include four or more sealing bumps 194, depending on the specific application and sealing system design parameters.

As noted previously, the sealing bumps 194 shown for each of embodiments depicted in FIGS. 11A-13C can have any suitable shape/configuration and size that would be appropriate for affecting the required metal seal against a mating sealing surface, such as the sealing surface 184s shown in FIGS. 7A-7D above. For example, in certain embodiments, the shape/configuration of each sealing bump 194 when viewed in cross-section may be substantially that of a circular segment having a substantially circular radius 194r, such as is shown in FIG. 7A above. In other embodiments, the shape of each sealing bump 194 when viewed in cross-section may be substantially that of an elliptical segment having an appropriately shaped surface geometry, depending on the specific seal design parameters. Additionally, each of the sealing bumps 194 has a sealing bump width 194w that extends across the upper surface 192s of the respective low-spread metal ring gasket 190.

With specific reference now to FIGS. 11A-11C, the upper ring gasket portion 192 of each of the depicted embodiments includes sealing bump protection wings 195 that extend laterally and angularly upward from opposing sides of the boss 193. As noted previously with respect to FIG. 7A above, the protection wings 195 are adapted to protect the sealing bumps 194 during the removal of a component from a connection, and/or the installation of a new or replacement component. Additionally, in certain applications the protection wings 195 may also be adapted to affect a secondary, or backup, metal-to-metal seal.

It should be noted that each of the embodiments illustrated in FIGS. 12A-12C depict low-spread metal ring gaskets 190 that are configured in substantially the same fashion as the embodiments that are illustrated in the corresponding FIGS. 11A-11C, with the exception that the exemplary embodiments shown in FIGS. 12A-12C do not include the protection wings 195 that are shown in each of the FIGS. 11A-11C. As such, the boss 193 of the upper ring gasket portion 192 extends upward from the lower ring gasket portion 191 to the upper surface 192s. Similarly, the exemplary embodiments shown in FIGS. 13A-13C also do not include the protection wings 195, however the upper ring gasket portions 192 of the low-spread metal ring gaskets 190 shown in FIGS. 13A-13C are configured differently than the upper ring gasket portions 192 of the embodiments shown in FIGS. 12A-12C. For example, the width of the boss 193 on the embodiments depicted in FIGS. 13A-13C is the same as the width of the lower ring gasket portion 191—that is, wherein the sides of the lower ring gasket portions 191 above the sealing surfaces 190s are aligned and flush with the sides of the boss 193—whereas the sides of the boss 193 on the low-spread metal ring gaskets 190 shown in FIGS. 12A-12C are laterally offset from the corresponding sides of the lower ring gasket portions 191.

FIGS. 14A-15C are cross-sectional views of some further optional configurations of the disclosed low-spread metal ring gaskets 190, wherein the lower ring gasket portion 191 has a modified configuration from that depicted by the embodiments illustrated in FIGS. 7A-7C and FIGS. 11A-13C above. More specifically, while the embodiments of the low-spread metal ring gaskets 190 shown in FIGS. 14A-14C are configured so as to match most aspects of respective embodiments shown in FIGS. 11A-11C and described above, the lower ring gasket portion 191 of each of the exemplary embodiments shown in FIGS. 14A-14C includes only one sealing surface 190s, rather than a pair of sealing surfaces positioned on opposing inner and outer sides of the lower ring gasket portion 191. In certain embodiments, the single sealing surface 190s may be positioned on the outer side of the lower ring gasket portion 191, in which case a metal-to-metal seal may be affected between the outer side sealing surface 190s and a corresponding outer sidewall sealing surface of a ring groove that is formed in the front face of a pressure-retaining component, e.g., the outer side sealing surface 176s of the ring groove 176 formed in the front face 174 of the first connection 172, such as is shown in FIGS. 7A-7C above. Additionally, in certain exemplary embodiments, the outer side sealing surface 190s may be configured so as to conform to the outer side sealing surface of a corresponding standard metal ring gasket, e.g., an API BX ring gasket and the like, so that the modified low-spread metal ring gaskets 190 shown in FIGS. 15A-15C can be installed in the ring groove a pressure-retaining component that conforms to a known standard, such as ANSI/API Specification 6A.

With continuing reference to FIGS. 14A-14C, the inner side surface 190x of the lower ring gasket portion 191—that is, the side facing inward toward the axis of revolution/central axis of the low-spread metal ring gasket 190—may be configured in substantially any manner such that it does not contact or affect a seal against any adjacent metal sealing surfaces, e.g., the inner side sealing surface 176s of the ring groove 176 shown in FIGS. 7A-7C above. In at least some embodiments, such as the embodiments depicted in FIGS. 14A-14C, the inner side (non-sealing) surface 190x of the lower ring gasket portion 191 may be substantially aligned and substantially flush with the inner side surface of the boss 193, although it should appreciated that substantially any inner side surface configuration may be acceptable provided the inner side 190x does not contact or seal against a metal sealing surface.

Similarly, the illustrative low-spread metal ring gaskets 190 depicted in FIGS. 15A-15C are configured so as to substantially match most aspects of respective embodiments shown in FIGS. 12A-12C above. However, as with the embodiments previously discussed with respect to FIGS. 14A-14C above, the lower ring gasket portions 191 of the embodiments depicted in FIGS. 15A-15C include only one sealing surface 190s, rather than the pair of opposing sealing surfaces shown in FIGS. 12A-12C. Furthermore, in some embodiments the single sealing surface 190s may be positioned on the outer side of the lower ring gasket portion 191, and may therefore be adapted to affect a metal-to-metal seal may against the corresponding outer sidewall sealing surface of a ring groove that is formed in the front face of a pressure-retaining component. Moreover, the outer side sealing surface 190s may be configured so as to conform to the outer side sealing surface of a corresponding standard metal ring gasket, such an API BX ring gasket and the like, so that the modified low-spread metal ring gaskets 190 shown in FIGS. 15A-15C can be used with a pressure-retaining component that conforms to a known standard, such as ANSI/API Specification 6A. Additionally, the inner side surface 190x of the lower ring gasket portion 191 may be configured in substantially any manner such that it does not contact or affect a seal against any adjacent metal sealing surfaces. For example, in one illustrative embodiment, the inner side (non-sealing) surface 190x may be substantially aligned and substantially flush with the inner side surface of the boss 193.

Figure 16:
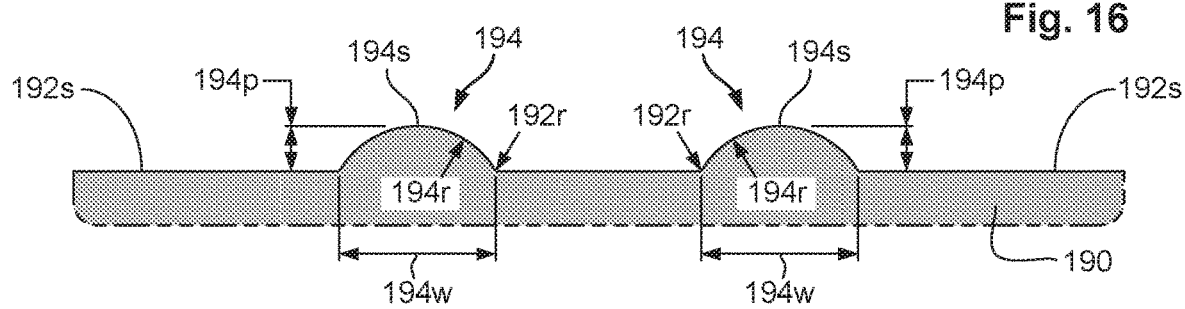
FIGS. 16-20 are close-up cross-sectional views showing different illustrative configurations of the sealing bumps that may be used on various exemplary embodiments of the low-spread metal ring gaskets disclosed herein.

FIGS. 16-20 are close-up cross-sectional views that depict various exemplary configurations of the sealing bumps that may be used on any of the illustrative low-spread metal ring gaskets 190 that are disclosed herein and described above. For example, FIG. 16 is a close-up detail that illustrates a sealing bump configuration and arrangement of an exemplary low-spread metal ring gasket 190 that is substantially similar to the arrangement depicted in FIGS. 7A-7C above. As shown in, FIG. 16 the low-spread metal ring gasket 190 includes two sealing bumps 194 that protrude out of the upper surface 192s of the ring gasket 190 such that an uppermost point of the sealing surface 194s is at a projection distance 194p above the upper surface 192s. Additionally, each sealing bump 194 is depicted as having the cross-sectional configuration that is substantially that of a circular segment having a substantially circular radius 194r, and a sealing bump width 194w that extends across the upper surface 192s. Furthermore, in certain embodiments a relief radius 192r may be formed at the intersection of the sealing surfaces 194s and the upper surface 192s of the low-spread metal ring gasket 190 so as to reduce localized stress concentrations. While the sealing bumps 194 shown in FIG. 16 have been depicted as having substantially the same size and configuration, it should be understood that any one or more of the radius 194r, the sealing bump width 194w, and the projection distance 194p may be different, as will be further described with respect to FIGS. 17 and 18 below.

Figure 17:
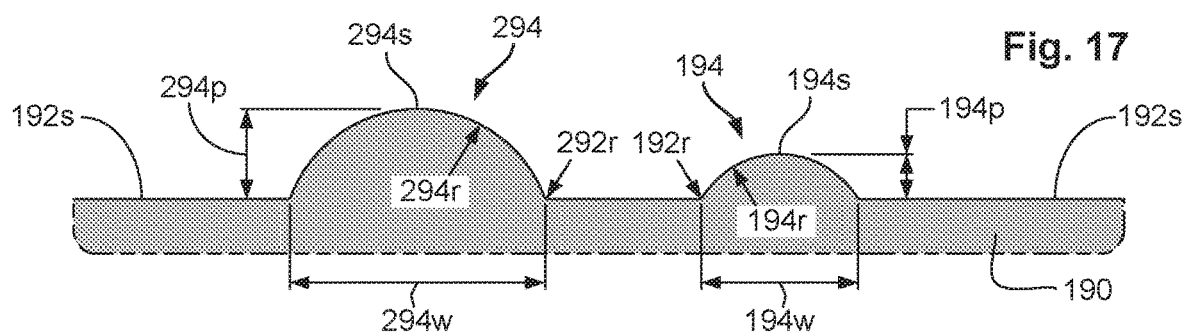

Turning now to FIG. 17, another exemplary low-spread metal ring gasket 190 is illustrated that include a first sealing bump 194 and a second sealing bump 294, wherein the first sealing bump 194 is depicted as having substantially similar configuration to the illustrative sealing bumps 194 shown in FIG. 16. For example, the first sealing bump 194 may have a cross-sectional configuration that is substantially that of a circular segment having a substantially circular first radius 194r, a first sealing bump width 194w, and a first sealing surface 194s that protrudes out of the upper surface 192s by a first sealing bump projection distance 194p. Similarly, the second sealing bump 294 may also have a cross-sectional configuration that is substantially that of a circular segment having a substantially circular second radius 294r, a second sealing bump width 294w, and a second sealing surface 294s that protrudes out of the upper surface 192s by a second sealing bump projection distance 294p. In certain embodiments, a first relief radius 192r may be used to blend the intersection of the upper surface 192s with the first sealing surface 194s of the first sealing bump 194, and in other embodiments a second relief radius 292r may also be used to blend the intersection of the upper surface 192s with the second sealing surface 294s of the second sealing bump 294.

However, in the illustrative embodiment shown in FIG. 17, the second sealing bump 294 is depicted as being larger than the first sealing bump 194, such that the second radius 294r, the second sealing bump width 294w, and the second projection distance 294p of the second sealing bump 294 are all greater than the corresponding first radius 194r, first sealing bump width 194w, and first projection distance 194p, respectively, of the first sealing bump 194. Furthermore, it should be understood that the second radius 294r of the second sealing bump 294 may be substantially the same as the first radius 194r of the first sealing bump 194 while the second sealing bump width 294w and the second projection distance 294p of the second sealing bump 294 may both be greater than the corresponding first sealing bump width 194w and first projection distance 194p, respectively, of the first sealing bump 194.

Figure 18:
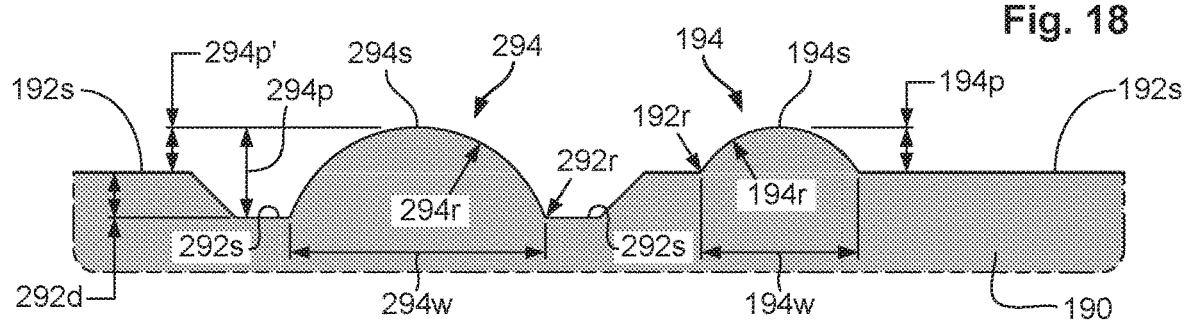

FIG. 18 depicts another sealing bump configuration that is similar in several respects to the embodiment illustrated in FIG. 17. For example, as is shown in FIG. 18, the low-spread metal ring gasket 190 may include a first sealing bump 194 and a second sealing bump 294, both of which are configured in substantially similar fashion to the first and second sealing bumps 194, 294 depicted in FIG. 17. However, in the exemplary embodiment of FIG. 18, the second sealing bump 294 is formed above a surface 292s that is recessed a distance 292d below the upper surface 192s of the low-spread metal ring gasket 190. Furthermore, the uppermost point of the second sealing surface 294s of the second sealing bump 294 protrudes out of the recessed surface 292s by a second projection distance 294p, and is also positioned at a third projection distance 294p' above the upper surface 192s of the low-spread metal ring gasket 190. In certain embodiments, the third projection distance 294p' may be substantially the same as the first projection distance 194p of the first sealing bump 194, whereas in other exemplary embodiments the third projection distance 294p' may be either greater than or less than the first projection distance 194p, depending on the specific design parameters of the low-spread metal ring gasket 190. Additionally, in at least some aspects of the present disclosure, a first relief radius 192r may be used at the intersection of the upper surface 192s with the first sealing surface 194s of the first sealing bump 194, and a second relief radius 292r may also be used at the intersection of the recessed surface 292s with the second sealing surface 294s of the second sealing bump 294.

Figure 19:
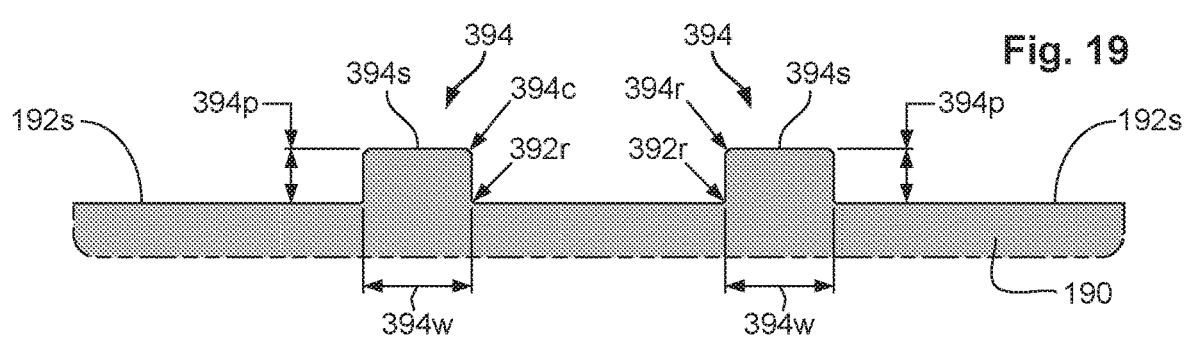
Figure 20:
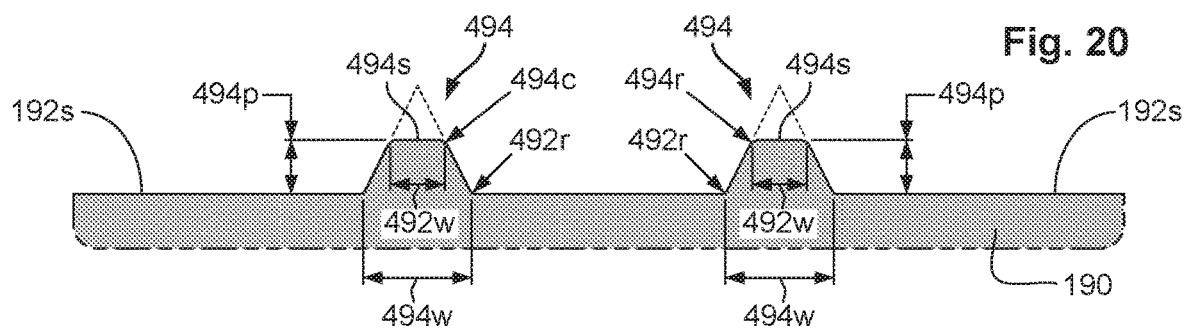

FIGS. 19 and 20 illustrate further exemplary sealing bump configurations wherein the sealing surfaces of the sealing bumps are substantially flat surfaces, rather than the curved (e.g., circular and/or elliptical) surfaces that are described above. For example, FIG. 19 depicts sealing bumps 394 that have a substantially rectangular cross-sectional configuration, such that the upper sealing surfaces 394s of the sealing bumps 394 are substantially flat, thus presenting a wider sealing area to the mating sealing surface 184s on the front face 184 of a corresponding connection 182 (not shown in FIG. 19; see, e.g., FIGS. 7A-10). In some aspects, the upper sealing surfaces 394s may be oriented substantially parallel to the upper surface 192s of the low-spread metal ring gasket 190, and/or substantially parallel to a corresponding mating sealing surface, such as the sealing surface 184s shown in FIGS. 7A-7D.

As shown in FIG. 19, the sealing bumps 394 may have a sealing bump width 394w, and may also protrude out of the upper surface 192s of the low-spread metal ring gasket 190 by a sealing bump projection distance 394p. In some embodiments the upper corners of the sealing bumps 394— that is, the corner that is defined by the intersection of the upper sealing surface 394s and the side surfaces of the sealing bump 394—may be dressed to have a chamfered configuration 394c or a radiused configuration 394r. In other exemplary embodiments the upper corners may not be dressed in any manner, thus providing a substantially sharp corner finish. Furthermore, in certain embodiments, a relief radius 392r may be used to blend the intersection of the upper surface 192s with the side surfaces of each sealing bump 394. Additionally, it should be understood that, as with the sealing bump configurations depicted in FIGS. 16-18, the width 394w and projection distance 394p of the sealing bumps 394 may be substantially the same (see, e.g., FIG. 16), or the sealing bumps 394 may have the same width 394w but a different projection distance 394p, or they may have the same projection distance 394p but a different width 394w (see, e.g., FIGS. 17 and 18), depending on the particular design parameters of the low-spread metal ring gasket 190.

FIG. 20 depicts another illustrative sealing bump configuration wherein the sealing surfaces of the sealing bumps are substantially flat surfaces. In particular, FIG. 20 shows sealing bumps 494 having a cross-sectional configuration that is substantially that of a truncated triangle (continuation of triangular shape indicated by dashed lines), wherein the upper sealing surfaces 494s of the truncated triangular sealing bumps 494 are also substantially flat. Also as shown in FIG. 20, the upper sealing surface 494s of each sealing bump 494 may have a width 492w, whereas the base of each sealing bump 494 (i.e., at the upper surface 192s of the low-spread metal ring gasket 190) may have a greater width 494w, due to the tapered (truncated triangular) side surface configuration of the sealing bumps 494. Furthermore, the sealing bumps 494 may protrude out of the upper surface 192s by a sealing bump projection distance 494p.

As with the substantially rectangular cross-sectional configurations depicted in FIG. 19, the upper corners of the sealing bumps 494 may be dressed to have a chamfered configuration 394c or a radiused configuration 394r, or in some embodiments the upper corners may not be dressed in any manner, thus providing a substantially sharp corner finish. Additionally, a relief radius 492r may be used at the intersection of the upper surface 192s with the tapered side surfaces of each sealing bump 494. Moreover, it should again be understood that, in certain exemplary embodiments, the sealing surface width 492w, the base width 494w, and the projection distance 494p of each sealing bump 394 may be substantially the same. In other embodiments, one, some, or all of the sealing surface widths 492w, the base widths 494w, and/or the projection distances 494p of each of the respective sealing bumps 494 may be different, depending on the design considerations for the particular low-spread metal ring gasket 190.

It should be understood by the ordinarily skilled artisan after a complete reading of the present disclosure that the sealing bumps that may be used in conjunction with the exemplary low-spread metal ring gaskets 190 disclosed herein are not limited solely to the cross-sectional shapes and configurations of the various sealing bumps 194, 294, 394, and/or 494 depicted in FIGS. 7A-20 and described above. Instead, the present subject matter covers any and all sealing bump cross-sectional shapes and configurations that may be suitable for affecting a metal-to-metal seal between mating pressure-retaining components in the manner disclosed herein.

As a result of the subject matter set forth above, new and unique low-spread metal-to-metal sealing systems are disclosed that may facilitate the removal of a pressure-retaining component from service without requiring the faces of mating connections to be spread apart by the large clearance distances that are often necessary in prior art high pressure and/or high temperature metal-to-metal sealing systems. Furthermore, the exemplary low-spread metal ring gaskets discussed herein can be adapted for use with a variety of connection types that utilize metal-to-metal sealing systems that are known and used in the art, such as connections in accordance with known standards like ANSI/API Specification 6A, or they can be adapted for use with specially designed and/or non-standard connection types, such as connections that are configured in accordance with known design rules and/or original equipment manufacturers (OEM) standards.

The particular embodiments disclosed above are illustrative only, as the subject matter defined by the appended claims may be modified and practiced in different but equivalent manners apparent to those skilled in the art having the benefit of the teachings set forth herein. Note that terms, such as "first," "second," "third" or "fourth" to describe various operations or structures in this specification and in the attached claims are only used as a shorthand reference to such steps/structures and do not necessarily imply that such steps/structures are performed or formed in that ordered sequence. Of course, depending upon the exact claim language, an ordered sequence of such operations may or may not be required. Accordingly, the protection sought herein is as set forth in the claims below.

What is claimed is:

1. A low-spread metal ring gasket, comprising:
    a lower ring gasket portion having a bottom surface and comprising at least one ring gasket sealing surface extending upward from said bottom surface; and
    an upper ring gasket portion having an upper surface and comprising at least one sealing bump protruding upward from said upper surface, and the at least one sealing bump having a width extending across said upper surface.

2. The low-spread metal ring gasket of claim 1, wherein said lower ring gasket portion is adapted to be inserted inside of a ring groove that is formed in a first front face of a first connection, and wherein said at least one ring gasket sealing surface is adapted to seal against a respective ring groove sealing surface inside of said ring groove.

3. The low-spread metal ring gasket of claim 2, wherein said at least one sealing bump comprises a sealing bump sealing surface and wherein said sealing bump sealing surface is adapted to seal against a front sealing surface on a second front face of a second connection.

4. The low-spread metal ring gasket of claim 3, wherein said front sealing surface is substantially parallel to said second front face of said second connection.

5. The low-spread metal ring gasket of claim 1, wherein said upper ring gasket portion comprises a boss that extends upward from said lower ring gasket portion.

6. The low-spread metal ring gasket of claim 5, further comprising sealing bump protection wings that extend laterally and angularly upward from opposing sides of said boss.

7. The low-spread metal ring gasket of claim 6, wherein said at least one sealing bump comprises a sealing bump sealing surface and wherein an uppermost point of said sealing bump sealing surface is at a first height above said bottom surface of said lower ring gasket portion, and wherein an uppermost point of an upper surface of said sealing bump protection wings is at a second height above said bottom surface of said lower ring gasket portion that is greater than said first height.

8. The low-spread metal ring gasket of claim 1, wherein said at least one sealing bump comprises at least two sealing bumps.

9. The low-spread metal ring gasket of claim 8, wherein each of said at least two sealing bumps have a cross-sectional configuration that is substantially that of a circular segment having a substantially circular radius.

10. The low-spread metal ring gasket of claim 1, wherein said at least one sealing bump comprises a first sealing bump that protrudes upward from said upper surface by a first projection distance and a second sealing bump that protrudes upward from said upper surface by a second projection distance that is different from said first projection distance.

11. The low-spread metal ring gasket of claim 10, wherein said first sealing bump has a cross-sectional configuration that is substantially that of a circular segment having a substantially circular first radius and said second sealing bump has a cross-sectional configuration that is substantially that of a circular segment having a substantially circular second radius that is different from said substantially circular first radius.

12. The low-spread metal ring gasket of claim 1, wherein said at least one ring gasket sealing surface is located on an outer side of said lower ring gasket portion relative to an axis of revolution of said low-spread metal ring gasket.

13. The low-spread metal ring gasket of claim 1, wherein said at least one ring gasket sealing surface comprises a first ring gasket sealing surface that is located on an inner side of said lower ring gasket portion relative to an axis of revolution of said low-spread metal ring gasket and a second ring gasket sealing surface that is located on an outer side of said lower ring gasket portion relative to said axis of revolution.

14. A low-spread metal-to-metal sealing system, comprising:
    a first pressure-retaining component comprising a first connection, wherein said first connection comprises a first front face and a ring groove that is formed in said first front face, said ring groove comprising a first ring groove sealing surface;
    a second pressure-retaining component comprising a second connection, wherein said second connection comprises a second front face and a front sealing surface located on said second front face; and
    a low-spread metal ring gasket that is adapted to create a metal-to-metal seal with said first and second pressure-retaining components, said low-spread metal ring gasket comprising:
        a lower ring gasket portion having a bottom surface and comprising a first ring gasket sealing surface extending upward from said bottom surface, wherein said lower ring gasket portion is adapted to be inserted inside of said ring groove, and wherein said first ring gasket sealing surface is adapted to seal against said first ring groove sealing surface; and
        an upper ring gasket portion having an upper surface and comprising at least one sealing bump protruding upward from said upper surface, and the at least one sealing bump having a width extending across said upper surface, wherein said at least one sealing bump comprises a sealing bump sealing surface that is adapted to seal against said front sealing surface of said second connection.

15. The low-spread metal-to-metal sealing system of claim 14, wherein said first front face of said first connection is adapted to contact said second front face of said second connection when said first pressure-retaining component is connected to said second pressure-retaining component and said low-spread metal ring gasket creates said metal-to-metal seal with said first and second pressure-retaining components.

16. The low-spread metal-to-metal sealing system of claim 14, wherein said upper ring gasket portion of said low-spread metal ring gasket comprises a boss that extends upward from said lower ring gasket portion, said low-spread metal ring gasket further comprising sealing bump protection wings that extend laterally and angularly upward from opposing sides of said boss.

17. The low-spread metal-to-metal sealing system of claim 16, wherein an uppermost point of said sealing bump sealing surface of said low-spread metal ring gasket is at a first height above said bottom surface of said lower ring gasket portion, and wherein an uppermost point of an upper surface of said sealing bump protection wings is at a second height above said bottom surface of said lower ring gasket portion that is greater than said first height.

18. The low-spread metal-to-metal sealing system of claim 14, wherein said at least one sealing bump of said low-spread metal ring gasket comprises at least two sealing bumps.

19. The low-spread metal-to-metal sealing system of claim 14, wherein said first ring gasket sealing surface of said low-spread metal ring gasket is located on an outer side of said lower ring gasket portion relative to an axis of revolution of said low-spread metal ring gasket.

20. The low-spread metal-to-metal sealing system of claim 14, wherein said lower ring gasket portion of said low-spread metal ring gasket further comprises a second ring gasket sealing surface that extends upward from said bottom surface of said lower ring gasket portion and is located on an opposite side of said lower ring gasket portion from said first ring gasket sealing surface, said second ring gasket sealing surface being adapted to seal against a second ring groove sealing surface of said ring groove.

21. A low-spread metal-to-metal sealing system, comprising:
    a first pressure-retaining component comprising a first connection, said first connection comprising a first front face and a ring groove that is formed in said first front face, wherein said ring groove comprises inner and outer ring groove sealing surfaces that are located on opposing sides of said ring groove;
    a second pressure-retaining component comprising a second connection, said second connection comprising a second front face and a front sealing surface located on said second front face, wherein said front sealing surface is substantially parallel to said second front face of said second connection; and
    a low-spread metal ring gasket that is adapted to create a metal-to-metal seal with said first and second pressure-retaining components, said low-spread metal ring gasket comprising:
        a lower ring gasket portion having a bottom surface and comprising inner and outer ring gasket sealing surfaces that extend upward from said bottom surface and that are located on opposing sides of said lower ring gasket portion, said inner and outer ring gasket sealing surfaces being adapted to seal against said respective inner and outer ring groove sealing surfaces; and
        an upper ring gasket portion having an upper surface, said upper ring gasket portion comprising:
            a boss extending upward from said lower ring gasket portion;
            at least one sealing bump protruding upward from said upper surface, and the at least one sealing bump having a width extending across said upper surface, wherein said at least one sealing bump comprises a sealing bump sealing surface that is adapted to seal against said front sealing surface of said second connection; and
            sealing bump protection wings that extend laterally and angularly upward from opposing sides of said boss.

* * * * *